(12) United States Patent
Zhang et al.

(10) Patent No.: US 12,035,298 B2
(45) Date of Patent: Jul. 9, 2024

(54) METHOD AND DEVICE FOR USE IN WIRELESS COMMUNICATION NODES RELATED TO SIDELINK

(71) Applicants: Xiaobo Zhang, Shanghai (CN); Lin Yang, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 473 days.

(21) Appl. No.: 17/348,778

(22) Filed: Jun. 16, 2021

(65) Prior Publication Data

US 2021/0314976 A1 Oct. 7, 2021

Related U.S. Application Data

(63) Continuation of application No. PCT/CN2019/122672, filed on Dec. 3, 2019.

(30) Foreign Application Priority Data

Dec. 17, 2018 (CN) .......................... 201811542661.1

(51) Int. Cl.
*H04W 72/1263* (2023.01)
*H04L 1/00* (2006.01)
(Continued)

(52) U.S. Cl.
CPC ....... *H04W 72/1263* (2013.01); *H04L 1/0003* (2013.01); *H04L 1/1819* (2013.01);
(Continued)

(58) Field of Classification Search
CPC ......... H04W 72/1263; H04W 72/0446; H04W 72/0453; H04W 92/10; H04W 92/18; H04L 1/0003; H04L 1/1819
See application file for complete search history.

(56) References Cited

U.S. PATENT DOCUMENTS

| 2009/0217119 A1* | 8/2009 | Zhang | H04L 1/1812 |
| | | | 714/748 |
| 2014/0233502 A1 | 8/2014 | Fong et al. | |

(Continued)

FOREIGN PATENT DOCUMENTS

| CN | 106559877 A | 4/2017 |
| CN | 107645774 A | 1/2018 |

(Continued)

OTHER PUBLICATIONS

3GPP TSG-RAN WG1 Meeting #94bis R1-1811615 Chengdu, China, Oct. 8-12, 2018 Source: ITL Title: Discussion on NR V2X HARQ mechanism (Year: 2018).*

(Continued)

*Primary Examiner* — Chi H Pham
*Assistant Examiner* — Weibin Huang

(57) ABSTRACT

The present disclosure provides a method and device for use in wireless communication nodes. A first node receives first information; receives a first signaling; transmits X first-type radio signals, X being a positive integer greater than 1; and transmits second information, the second information comprising Y first-type information bit(s), Y being a positive integer; the first information is used to determine the second information; only the Y first-type information bit(s) comprised in the second information is(are) used to indicate whether at least one of the X first-type radio signals is correctly received; a target receiver of any of the X first-type radio signals is different from a target receiver of the second information. The method in the present disclosure effec- (Continued)

tively avoids the frequent reporting of the UE under the working mode of the base station controlling resource allocation, thus reducing the signaling overhead and retransmission delay of Uu Interface.

18 Claims, 7 Drawing Sheets

(51) Int. Cl.
  *H04L 1/1812* (2023.01)
  *H04W 72/0446* (2023.01)
  *H04W 72/0453* (2023.01)
  *H04W 92/10* (2009.01)
  *H04W 92/18* (2009.01)

(52) U.S. Cl.
  CPC ... *H04W 72/0446* (2013.01); *H04W 72/0453* (2013.01); *H04W 92/10* (2013.01); *H04W 92/18* (2013.01)

(56) References Cited

U.S. PATENT DOCUMENTS

| | | | | |
|---|---|---|---|---|
| 2018/0287763 A1* | 10/2018 | Baghel | ............... | H04W 72/044 |
| 2019/0268971 A1* | 8/2019 | Talarico | ............... | H04W 76/27 |
| 2019/0363843 A1* | 11/2019 | Gordaychik | ............ | H04L 1/08 |
| 2020/0287654 A1* | 9/2020 | Xi | ..................... | H04L 5/0055 |
| 2021/0112582 A1* | 4/2021 | Lee | ................... | H04W 72/535 |

FOREIGN PATENT DOCUMENTS

| | | |
|---|---|---|
| CN | 107872299 A | 4/2018 |
| CN | 108323228 A | 7/2018 |
| CN | 108988983 A | 12/2018 |
| WO | 2017118229 A1 | 7/2017 |
| WO | 2018004296 A2 | 1/2018 |
| WO | 2018048273 A1 | 3/2018 |
| WO | 2018084673 A1 | 5/2018 |
| WO | 2018131880 A1 | 7/2018 |
| WO | 2018164450 A1 | 9/2018 |
| WO | 2018169327 A1 | 9/2018 |

OTHER PUBLICATIONS

3GPP TSG RAN WG1 Meeting #78 R1-143076 Dresden, Germany, Aug. 18-22, 2014 Source: Samsung Title: Control information needed for D2D broadcast communication (Year: 2014).*
ISR in application PCT/CN2019/122672 dated Jan. 16, 2020.
Huawei et al."R1-1808938.Sidelink Data Channel Design of NR V2X" 3GPPTSGRAN WG1 Meeting #94,Aug. 24, 2018(Aug. 24, 2018).
European Search Report received in application No. EP19898189.6 dated Feb. 2, 2022.
CN201811542661.1 First Office Action dated Jan. 29, 2022.
CN201811542661.1 First Search Report dated Jan. 21, 2022.
CN201811542661.1 Notification to Grant Patent Right for Invention dated Jun. 27, 2022.
CN201811542661.1 Supplemental Search Report dated May 31, 2022.
Samsung "ControlinformationneededforD2Dbroadcastcommunication" 3GPPTSGRANWG1Meeting#78 R1-143076, Aug. 17, 2014.
Huawei,HiSilicon"DiscussiononHARQsupportforNRsidelink" 3GPPTSG-RANWG2#104 R2-1818198, Nov. 2, 2018.
Ericsson "PhysicallayerstructureforSLNRV2X" 3GPPTSG-RANWG1Meeting#95 R1-1813638, Nov. 2, 2018.
ZTE "InitialconsiderationonNRV2Xresourceallocation" 3GPPTSG-RANWG2#103bis ,R2-1814168, Sep. 28, 2018.
Sony "DiscussiononHARQfeedbackforNRV2Xcommunication" 3GPPTSGRANWG1Meeting#95 , R1-1813138, Nov. 16, 2018.
Huawei,HiSilicon "SidelinkphysicallayerproceduresforNRV2X" 3GPPTSGRANWG1Meeting#95 , R1-1812205, Nov. 16, 2018.
ITL "DiscussiononNRV2XHARQmechanism" 3GPPTSG—RANWG1Meeting#94bis R1-1811615, Sep. 29, 2018.
First Office Action received in application No. IN202117030618 dated Mar. 10, 2022.
First Office Action of Chinese patent application No. CN202210973760.5 dated Jan. 20, 2024.
First Search Report of Chinese patent application No. CN202210973760.5 dated Jan. 18, 2024.

\* cited by examiner

METHOD AND DEVICE FOR USE IN WIRELESS COMMUNICATION NODES RELATED TO SIDELINK

CROSS REFERENCE TO RELATED APPLICATIONS

This application is a continuation of International Application No. PCT/CN2019/122672, filed Nov. 3, 2019, claims the priority benefit of Chinese Patent Application No. 201811542661.1, filed on Dec. 17, 2018, the full disclosure of which is incorporated herein by reference.

BACKGROUND

Technical Field

The present disclosure relates to transmission methods and devices in wireless communication systems, and in particular to a transmission scheme and device in wireless communications related to sidelink, multi-antenna, and bandwidth.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. Besides, 3GPP RAN #80 plenary has started an NR-based V2X technical research.

SUMMARY

Compared with the existing LTE V2X system, NR V2X has a notable feature in supporting Groupcast and Unicast as well as Hybrid Automatic Repeat Request (HARQ) function. When an NR V2X User Equipment (UE) is in-coverage and works under a resource allocation mode (that is, NR V2X Mode 1) controlled by a base station, in order to support retransmission scheduling of HARQ, a most straightforward method is that a base station schedules an NR V2X UE A to transmit a radio signal to another NR V2X UE B as a receiver via sidelink, the UE B feeds HARQ information back to the UE A via sidelink, then the UE A directly transfers the received HARQ information to the base station, and waits for the base station to schedule the retransmission resources again. This one-to-one reporting method will greatly increase signaling overhead at a Uu interface and increases transmission delay of retransmission.

In view of the problem of HARQ retransmission in NR V2X, the present disclosure discloses a solution for HARQ reporting. It should be noted that the embodiments in a UE in the present disclosure and characteristics of the embodiments may be applied to a base station if no conflict is incurred, and vice versa. And the embodiments in the present disclosure and the characteristics in the embodiments can be arbitrarily combined if there is no conflict. Though originally targeted at single-carrier communications, the present disclosure is also applicable to multicarrier communications. And though originally targeted at single-antenna communications, the present disclosure is also applicable to multi-antenna communications.

The present disclosure provides a method in a first node for wireless communications, comprising:
  receiving first information;
  receiving a first signaling;
  transmitting X first-type radio signals, X being a positive integer greater than 1; and
  transmitting second information, the second information comprising Y first-type information bit(s), Y being a positive integer;
  herein, the first information is used to determine the second information, and the first signaling is used to determine scheduling information of at least one of the X first-type radio signals; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted Modulation and Coding Scheme (MCS) or an adopted Redundancy Version (RV); the first information, the first signaling and the second information are all transmitted via a first-type air interface.

In one embodiment, the first node reports HARQ information flexibly according to the usage of resources.

In one embodiment, the first node compresses HARQ received via sidelink and then reports it to the second node.

In one embodiment, the above embodiment is characterized in that an association is established between the first information and the second information to ensure that a signal corresponding to the second information is configurable, so as to achieve the purpose of reducing time delay.

In one embodiment, the above embodiment is characterized in that an association is established between the second information and third information in the present disclosure, so that the first node avoids one-by-one reporting, which reduces signaling overhead of the Uu interface.

In one embodiment, the above embodiment is advantageous in that a mapping relation between the second information and a radio signal is configured via the first information and the second information does not comprises all the third information, which avoids frequent reporting of the first node and reduces signaling overhead and retransmission delay.

According to one aspect of the present disclosure, the above method is characterized in comprising:
  determining the second information;
  herein, the first information is used to determine the mapping between the Y first-type information bit(s) in the second information and the X first-type radio signals, or the first information is used to determine the Y, or the first information is used to determine the mapping between the Y first-type information bit(s) in the second information and the X first-type radio signals as well as the Y.

According to one aspect of the present disclosure, the above method is characterized in that the Y first-type information bit(s) is(are) divided into Y1 bit-group(s), at least one of the Y1 bit-group(s) is used to indicate whether at least one of the X first-type radio signals is correctly received, or at least one of the Y1 bit-group(s) is used to indicate whether at least one of the X first-type radio signals is not correctly received.

According to one aspect of the present disclosure, the above method is characterized in that a first bit block is used to generate any of the X first-type radio signals, and the first bit block comprises at least one bit; RVs of the X first-type radio signals are the same, or a time-domain position of time-domain resources occupied by a first-type radio signal of the X first-type radio signals is used to determine an RV of the first-type radio signal.

According to one aspect of the present disclosure, the above method is characterized in that X bit blocks are respectively used to generate the X first-type radio signals, and any of the X bit blocks comprises at least one bit; the X first-type radio signals respectively correspond to X HARQ processes, the X bit blocks respectively belong to the X HARQ processes, a first HARQ process is one of the X HARQ processes, a time-domain position of time-domain resources occupied by a first-type radio signal of the X first-type radio signals corresponding to the first HARQ process is used to determine a signature identity of the first HARQ process.

According to one aspect of the present disclosure, the above method is characterized in comprising:
receiving third information;
herein, a transmitter of the third information is the same as a target receiver of at least one of the X first-type radio signals; the third information is used to indicate whether at least one of the X first-type radio signals is correctly received, or the third information is used to indicate whether at least one of the X first-type radio signals is not correctly received; the third information is used to generate the second information.

According to one aspect of the present disclosure, the above method is characterized in comprising:
transmitting a second signaling;
herein, the second signaling is used to indicate the scheduling information of at least one of the X first-type radio signals, and the first signaling is used to determine information carried by the second signaling; a target receiver of the second signaling is the same as a target receiver of at least one of the X first-type radio signals, the second signaling is transmitted via a second-type air interface, and the second-type air interface is different from the first-type air interface.

According to one aspect of the present disclosure, the above method is characterized in that when an information bit other than the Y first-type information bit(s) is comprised in the second information, the first signaling is used to indicate a first time-frequency-resource set, at least one of a time-domain position of time-domain resources in the first time-frequency-resource set or a frequency-domain position of frequency-domain resources in the first time-frequency-resource set is used to determine a distribution pattern of the Y first-type information bit(s) in the at least one information bit comprised in the second information.

According to one aspect of the present disclosure, the above method is characterized in that the first node is a UE.

According to one aspect of the present disclosure, the above method is characterized in that the first node is a relay node.

The present disclosure provides a method in a second node for wireless communications, comprising:
transmitting first information;
transmitting a first signaling; and
receiving second information, the second information comprising Y first-type information bit(s), Y being a positive integer;
herein, the first information is used to determine the second information, and the first signaling is used to determine scheduling information of at least one of X first-type radio signals, and the X first-type radio signals are transmitted by a target receiver of the first signaling; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface.

According to one aspect of the present disclosure, the above method is characterized in that the Y first-type information bit(s) is(are) divided into Y1 bit-group(s), at least one of the Y1 bit-group(s) is used to indicate whether at least one of the X first-type radio signals is correctly received, or at least one of the Y1 bit-group(s) is used to indicate whether at least one of the X first-type radio signals is not correctly received.

According to one aspect of the present disclosure, the above method is characterized in that when an information bit other than the Y first-type information bit(s) is comprised in the second information, the first signaling is used to indicate a first time-frequency-resource set, at least one of a time-domain position of time-domain resources in the first time-frequency-resource set or a frequency-domain position of frequency-domain resources in the first time-frequency-resource set is used to determine a distribution pattern of the Y first-type information bit(s) in the at least one information bit comprised in the second information.

According to one aspect of the present disclosure, the above method is characterized in that the second node is a base station.

According to one aspect of the present disclosure, the above method is characterized in that the second node is a relay node.

The present disclosure provides a first node for wireless communications, comprising:
a first receiver, which receives first information;
a second receiver, which receives a first signaling;
a first transmitter, which transmits X first-type radio signals, X being a positive integer greater than 1; and
a second transmitter, which transmits second information, the second information comprising Y first-type information bit(s), Y being a positive integer;
herein, the first information is used to determine the second information, and the first signaling is used to determine scheduling information of at least one of the X first-type radio signals; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface.

The present disclosure provides a second node for wireless communications, comprising:

a third transmitter, which transmits first information;
a fourth transmitter, which transmits a first signaling; and
a third receiver, which receives second information, the second information comprising Y first-type information bit(s), Y being a positive integer;

herein, the first information is used to determine the second information, and the first signaling is used to determine scheduling information of at least one of X first-type radio signals, and the X first-type radio signals are transmitted by a target receiver of the first signaling; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface.

In one embodiment, the present disclosure is advantageous in the following aspects:

the present disclosure reports HARQ information flexibly according to the resource usage of the first node.

the present disclosure compresses HARQ received by the first node via sidelink and then reports it to the second node.

the present disclosure establishes an association between the first information and the second information to ensure that a signal corresponding to the second information is configurable, so as to achieve the purpose of reducing time delay.

the present disclosure establishes an association between the second information and the third information, so that the first node avoids one-by-one reporting, which reduces signaling overhead of the Uu interface.

the present disclosure configures a mapping relation between the second information and a radio signal via the first information and the second information does not comprises all the third information, which avoids frequent reporting of the first node and reduces signaling overhead and retransmission delay.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

Figure 1:
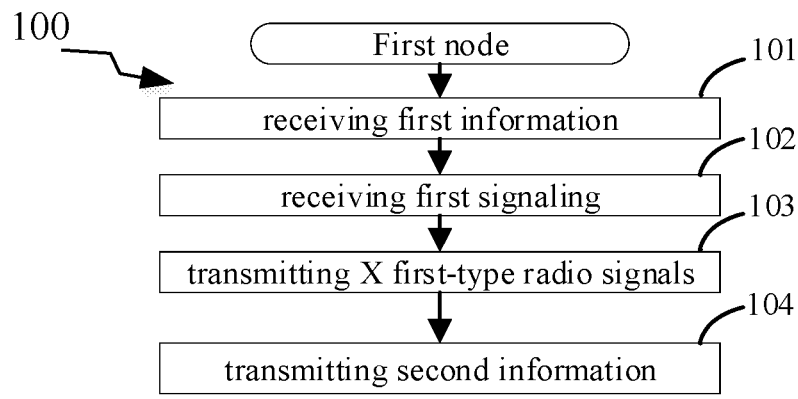
FIG. 1 illustrates a flowchart of the processing of a first node according to one embodiment of the present disclosure.

The technical scheme of the present disclosure is described below in further details in conjunction with the drawings. It should be noted that the embodiments of the present disclosure and the characteristics of the embodiments may be arbitrarily combined if no conflict is caused.

The following definitions given in the present disclosure can be used in all embodiments in the present disclosure and characteristics of the embodiments:

A first-type channel comprises at least one of a Broadcast Channel (BCH), a Physical Broadcast Channel (PBCH), a Physical Downlink Control Channel (PDCCH), a Physical Downlink Shared Channel (PDSCH), a Narrowband Physical Broadcast Channel (NPBCH), a Narrowband Physical Downlink Control Channel (NPDCCH), or a Narrowband Physical Downlink Shared Channel (NPDSCH).

A second-type channel comprises at least one of a Physical Random Access Channel (PRACH), a Physical Uplink Control Channel (PUCCH), a Physical Uplink Shared Channel (PUSCH), a Narrowband Physical Random Access Channel (NPRACH), a Narrowband Physical Uplink Shared Channel (NPUSCH), or a Short Physical Uplink Control Channel (SPUCCH).

A third-type channel comprises at least one of a Sidelink Broadcast Channel (SL-BCH), a Physical Sidelink Broadcast Channel (PSBCH), a Physical Sidelink Discovery Channel (PSDCH), a Physical Sidelink Control Channel (PSCCH), a Physical Sidelink Feedback Channel (PSFCH) or a Physical Sidelink Shared Channel (PSSCH).

A first-type signal comprises at least one of a Primary Synchronization Signal (PSS), a Secondary Synchronization Signal (SSS), a Synchronization Signal/Physical Broadcast Channel (SSB), a Narrowband Primary Synchronization Signal (NPSS), a Narrowband Secondary Synchronization Signal (NSSS), a Reference Signal (RS), a Channel State Information-Reference Signal (CSI-RS), a Downlink Demodulation Reference Signal (Downlink Demodulation Reference Signal), a Discovery Signal (DS), a Narrowband Reference Signal (NRS), a Positioning Reference Signal (PRS), a Narrowband Positioning Reference Signal (NPRS), or a Phase-Tracking Reference Signal (PT-RS).

A second-type signal comprises at least one of a Preamble, an Uplink Demodulation Reference Signal (UL DMRS), a Sounding Reference Signal (SRS), or an Uplink Tracking Reference Signal (UL TRS).

A third-type signal comprises at least one of a Sidelink Synchronization Signal (SLSS), a Primary Sidelink Synchronization Signal (PSSS), a Secondary Sidelink Synchronization Signal (SSSS), a Sidelink Demodulation Reference Signal (SL DMRS), or a PSBCH Demodulation Reference Signal (PSBCH-DMRS).

In one embodiment, the third-type signal comprises a PSSS and an SSSS.

In one embodiment, the third-type signal comprises a PSSS, an SSSS and a PSBCH.

A first pre-processing comprises at least one of first-level scrambling, TB-level Cyclic Redundancy Check (CRC) Attachment, Channel Coding, Rate Matching, second-level scrambling, Modulation, Layer Mapping, Transform Precoding, Precoding, Mapping to Physical Resources, Baseband Signal Generation, or Modulation and Upconversion.

In one embodiment, the first precoding is sequentially first-level scrambling, TB-level CRC Attachment, Channel Coding, Rate Matching, second-level scrambling, Modulation, Layer Mapping, Transform Precoding, Precoding, Mapping to Physical Resources, Baseband Signal Generation, and Modulation and Upconversion.

A second preprocessing comprises at least one of TB-level CRC attachment, Code Block Segmentation, CB-level CRC attachment, channel coding, rate matching, Code Block Concatenation, scrambling, modulation, layer mapping, antenna port mapping, Mapping to Virtual Resource Blocks, Mapping from Virtual to Physical Resource Blocks, Baseband Signal Generation, or Modulation and Upconversion.

In one embodiment, the second preprocessing is sequentially TB-level CRC attachment, CB-level segmentation, CB-level CRC attachment, channel coding, rate matching, Code Block Concatenation, scrambling, modulation, layer mapping, antenna port mapping, Mapping to Virtual Resource Blocks, Mapping from Virtual to Physical Resource Blocks, Baseband Signal Generation, and Modulation and Upconversion.

In one embodiment, the channel coding is based on a polar code.

In one embodiment, the channel coding is based on a Low-density Parity-Check (LDPC) code.

Embodiment 1

Embodiment 1 illustrates a flowchart of the processing of a first node according to one embodiment of the present disclosure, as shown in FIG. 1. In FIG. 1, each block represents a step. In Embodiment 1, the first node in the present disclosure first receives first information; then receives a first signaling; and then transmits X first-type radio signals, X being a positive integer greater than 1; finally transmits second information, and the second information comprises Y first-type information bit(s), Y being a positive integer; the first information is used to determine the second information, and the first signaling is used to determine scheduling information of at least one of the X first-type radio signals; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface.

In one embodiment, any of the X first-type radio signals comprises the third-type signal in the present disclosure.

In one embodiment, any of the X first-type radio signals is transmitted on the third-type channel in the present disclosure.

In one embodiment, any of the X first-type radio signals is transmitted on a PSSCH.

In one embodiment, any of the X first-type radio signals is transmitted on a PSCCH.

In one embodiment, any of the X first-type radio signals is transmitted on a PSCCH and a PSSCH.

In one embodiment, any of the X first-type radio signals is cell-specific.

In one embodiment, any of the X first-type radio signals is UE-specific.

In one embodiment, any of the X first-type radio signals is broadcast.

In one embodiment, any of the X first-type radio signals is groupcast.

In one embodiment, any of the X first-type radio signals is unicast.

In one embodiment, any of the X first-type radio signals comprises all or part of a higher-layer signaling.

In one embodiment, any of the X first-type radio signals comprises all or part of an RRC-layer signaling.

In one embodiment, any of the X first-type radio signals comprises one or more fields in an RRC IE.

In one embodiment, any of the X first-type radio signals comprises all or part of a MAC-layer signaling.

In one embodiment, any of the X first-type radio signals comprises one or more fields in a MAC CE.

In one embodiment, any of the X first-type radio signals comprises one or more fields in a PHY layer.

In one embodiment, any of the X first-type radio signals comprises one or more fields in a Master Information Block (MIB).

In one embodiment, any of the X first-type radio signals comprises one or more fields in an MIB-SL.

In one embodiment, any of the X first-type radio signals comprises one or more fields in an MIB-V2X-SL.

In one embodiment, any of the X first-type radio signals comprises one or more fields in an SIB.

In one embodiment, any of the X first-type radio signals comprises one or more fields in a piece of SCI.

In one embodiment, any of the X first-type radio signals does not comprise one or more fields in a piece of SCI.

In one embodiment, any of the X first-type radio signals comprises one or more fields in a SCI format.

In one embodiment, any of the X first-type radio signals does not comprise one or more fields in a SCI format.

In one embodiment, a subcarrier spacing of a subcarrier occupied by one of the X first-type radio signals is one of 15 kHz, 30 kHz, 60 kHz, 120 kHz, 240 kHz, 480 kHz or 960 kHz.

In one embodiment, a number of multicarrier symbols comprised in one of the X first-type radio signals in time domain is one of 1 multicarrier symbol, 2 multicarrier symbols, 3 multicarrier symbols, 4 multicarrier symbols, 5 multicarrier symbols, 6 multicarrier symbols, 7 multicarrier symbols, 11 multicarrier symbols, 12 multicarrier symbols, 13 multicarrier symbols, or 14 multicarrier symbols.

In one embodiment, target receivers of the X first-type radio signals comprises a UE.

In one embodiment, target receivers of the X first-type radio signals comprises multiple UEs.

In one embodiment, target receivers of the X first-type radio signals comprises a relay node.

In one embodiment, target receivers of the X first-type radio signals comprises multiple relay nodes.

In one embodiment, there exist target receivers of two of the X first-type radio signals being different.

In one embodiment, target receivers of the X first-type radio signals are the same.

In one embodiment, the first signaling is transmitted through the first-type channel in the present disclosure.

In one embodiment, the first signaling is transmitted through a PDCCH.

In one embodiment, the first signaling is Broadcast.

In one embodiment, the first signaling is Groupcast.

In one embodiment, the first signaling is Unicast.

In one embodiment, the first signaling is Cell-specific.

In one embodiment, the first signaling is UE-specific.

In one embodiment, the first signaling is semi-statically configured.

In one embodiment, the first signaling is dynamically configured.

In one embodiment, the first signaling comprises all or part of a higher-layer signaling.

In one embodiment, the first signaling comprises all or part of a Radio Resource Control (RRC) layer signaling.

In one embodiment, the first signaling comprises one or more fields in an RRC Information Element (IE).

In one embodiment, the first signaling comprises one or more fields in a System Information Block (SIB).

In one embodiment, the first signaling comprises all or part of a Multimedia Access Control (MAC) layer signaling.

In one embodiment, the first signaling comprises one or more fields in a MAC Control Element (CE).

In one embodiment, the first signaling comprises one or more fields in a Physical Layer (PHY) layer signaling.

In one embodiment, the first signaling comprises one or more fields in a piece of Downlink Control Information (DCI).

In one embodiment, the first signaling comprises one or more fields in a DCI format.

In one embodiment, the first signaling is a piece of DCI.

In one embodiment, the first signaling belongs to a DCI format.

In one embodiment, the first signaling is used to determine scheduling information of at least one of the X first-type radio signals.

In one embodiment, the first signaling is used to determine scheduling information of any of the X first-type radio signals.

In one embodiment, the first signaling is used to determine scheduling information of all of the X first-type radio signals.

In one embodiment, the first signaling comprises scheduling information of at least one of the X first-type radio signals.

In one embodiment, the first signaling comprises scheduling information of any of the X first-type radio signals.

In one embodiment, the first signaling comprises scheduling information of all of the X first-type radio signals.

In one embodiment, scheduling information of only one of the X first-type radio signals is determined by the first signaling.

In one embodiment, the first signaling indicates time-frequency resources occupied by at least one of the X first-type radio signals.

In one embodiment, the first signaling indicates an MCS adopted by at least one of the X first-type radio signals.

In one embodiment, the first signaling indicates an RV adopted by at least one of the X first-type radio signals.

In one embodiment, the first signaling indicates occupied time-frequency resources and an adopted MCS of at least one of the X first-type radio signals.

In one embodiment, the first signaling indicates occupied time-frequency resources and an adopted RV of at least one of the X first-type radio signals.

In one embodiment, the first signaling indicates an adopted MCS and an adopted RV of at least one of the X first-type radio signals.

In one embodiment, the first signaling indicates occupied time-frequency resources, an adopted MCS and an adopted RV of at least one of the X first-type radio signals.

In one embodiment, the first signaling comprises three first-type fields, and the three first-type fields are respectively used to indicate occupied time-frequency resources, an adopted MCS and an adopted RV of at least one of the X first-type radio signals.

In one embodiment, the first signaling comprises at least one first field, and the at least one first-type field is(are respectively) used to indicate occupied time-frequency resources, an adopted MCS and an adopted RV of all of the X first-type radio signals.

In one embodiment, the first signaling comprises at least one first-type field, and the at least one first-type field is used to indicate scheduling information of at least one of the X first-type radio signals.

In one embodiment, a CRC code of the first signaling is used to indicate scheduling information of at least one of the X first-type radio signals.

In one embodiment, a Demodulation Reference Signal (DMRS) of the first signaling is used to indicate scheduling information of at least one of the X first-type radio signals.

In one embodiment, the first signaling is used to indicate time-frequency resources occupied by the second information.

In one embodiment, the first signaling is used to indicate time-domain resources occupied by the second information.

In one embodiment, the first signaling is used to indicate frequency-domain resources occupied by the second information.

In one embodiment, the first signaling is used to indicate a time interval between a time for receiving the first signaling and a time for transmitting the second information.

In one embodiment, the first signaling is used to indicate a time interval between a time for transmitting the first signaling and a time for receiving the second information.

In one embodiment, the first signaling comprises a time interval between a time for receiving at least one of the X first-type radio signals and a time for transmitting the third information.

In one embodiment, the first signaling comprises a time interval between a time for transmitting at least one of the X first-type radio signals and a time for receiving the third information.

In one embodiment, the scheduling information comprises occupied time-frequency resources.

In one embodiment, the scheduling information comprises an adopted MCS.

In one embodiment, the scheduling information comprises an adopted RV.

In one embodiment, the scheduling information comprises occupied time-frequency resources and adopted MCS.

In one embodiment, the scheduling information comprises occupied time-frequency resources and adopted RV.

In one embodiment, the scheduling information comprises adopted MCS and adopted RV.

In one embodiment, the scheduling information comprises occupied time-frequency resources, adopted MCS and adopted RV.

In one embodiment, the scheduling information comprises occupied time-frequency resources, an adopted MCS and an adopted RV of at least one of the X first-type radio signals.

In one embodiment, the scheduling information comprises occupied time-frequency resources, an adopted MCS and an adopted RV of one of the X first-type radio signals.

In one embodiment, the scheduling information comprises occupied time-frequency resources, an adopted MCS and an adopted RV of all of the X first-type radio signals.

In one embodiment, the second information is transmitted through the second-type channel in the present disclosure.

In one embodiment, the second information is transmitted through an Uplink Shared Channel (UL-SCH).

In one embodiment, the second information is transmitted through a PUCCH.

In one embodiment, the second information is transmitted through a PUSCH.

In one embodiment, the second information is Broadcast.

In one embodiment, the second information is Groupcast.

In one embodiment, the second information is Unicast.

In one embodiment, the second information is Cell-specific.

In one embodiment, the second information is UE-specific.

In one embodiment, the second information is semi-statically configured.

In one embodiment, the second information is dynamically configured.

In one embodiment, the second information comprises all or part of a higher-layer signaling.

In one embodiment, the second information comprises all or part of an RRC signaling.

In one embodiment, the second information comprises one or more fields in an RRC IE.

In one embodiment, the second information comprises one or more fields in a SIB.

In one embodiment, the second information comprises all or part of a MAC layer signaling.

In one embodiment, the second information comprises one or more fields in a MAC CE.

In one embodiment, the second information comprises one or more fields in a PHY layer signaling.

In one embodiment, the second information comprises one or more fields in Uplink Control Information (UCI).

In one embodiment, the second information comprises one or more fields in a PUCCH format.

In one embodiment, the second information is one piece of UCI.

In one embodiment, the second information belongs to a PUCCH format.

In one embodiment, the second information comprises a Hybrid Automatic Repeat request-Acknowledge Codebook (HARQ-ACK codebook).

In one embodiment, the second information is a Sidelink-related HARQ-ACK codebook (SL-related HARQ-ACK codebook).

In one embodiment, the second information is configurable.

In one embodiment, the second information is pre-configured.

In one embodiment, a target receiver of the second information is a base station.

In one embodiment, a target receiver of the second information is a relay node.

In one embodiment, a target receiver of the second information is a gNB.

In one embodiment, a target receiver of any of the X first-type radio signals is a UE, and a target receiver of the second information is a base station.

In one embodiment, a target receiver of any of the X first-type radio signals is a UE, and a target receiver of the second information is a relay node.

In one embodiment, a target receiver of any of the X first-type radio signals is a relay node, and a target receiver of the second information is a base station.

In one embodiment, the second information explicitly indicates whether the X first-type radio signals are correctly received or not.

In one embodiment, the second information implicitly indicates whether the X first-type radio signals are correctly received or not.

In one embodiment, the second information only indicates that the X first-type radio signals are not correctly received.

In one embodiment, the second information comprises a Negative Acknowledge (NACK) information bit, and does not comprise a Acknowledge (ACK) information bit.

In one embodiment, the second information only comprises the Y first-type information bit(s), that is, there is no information bit other than the Y first-type information bit(s) in the second information.

In one embodiment, the second information comprises Y0 information bit(s) and the Y first-type information bit(s), and any of the Y first-type information bit(s) does not belong to the Y0 information bit(s), the Y0 being a positive integer.

In one embodiment, a first information bit is one of the Y first-type information bit(s), and a first radio signal is one of the X first-type radio signals corresponding to the first information bit; a value of the first information bit is 0, which represents that the first radio signal is not correctly received; a value of the first information bit is 1, which represents that the first radio signal is correctly received.

In one embodiment, a first information bit is one of the Y first-type information bit(s), and a first radio signal is one of the X first-type radio signals corresponding to the first information bit; the first information bit only indicates that the first radio signal is not correctly received.

In one embodiment, the Y first-type information bit(s) indicates (respectively indicate) that the X first-type radio signals are not correctly received.

In one embodiment, the Y is equal to the X.

In one embodiment, the Y is less than the X.

In one embodiment, the Y first-type information bit(s) indicates (respectively indicate) X2 first-type radio signal(s) corresponding to the Y first-type information bit(s) in the X first-type radio signals, X2 being a positive integer less than X.

In one embodiment, the Y is equal to the X2.

In one embodiment, the Y is less than the X2.

In one embodiment, the Y first-type information bit(s) is(are respectively) Y HARQ-ACK information bit(s), and the HARQ-ACK information bit is used to indicate one of ACK or NACK.

In one embodiment, the Y first-type information bit(s) is(are respectively) Y HARQ-ACK information bit(s), and the HARQ-ACK information bit is used to indicate ACK and NACK.

In one embodiment, the Y first-type information bit(s) is(are respectively) Y HARQ-ACK information bit(s), and the HARQ-ACK information bit is used to indicate ACK or NACK.

In one embodiment, the first information bit is an HARQ-ACK information bit.

In one embodiment, any of the Y first-type information bit(s) is used to indicate NACK, and the Y first-type information bit(s) does not indicate ACK.

In one embodiment, the first information bit is a NACK information bit.

In one embodiment, the Y0 information bit(s) is(are) Channel State Information (CSI) information bit(s).

In one embodiment, the Y0 information bit(s) is(are) Scheduling Request (SR) information bit(s).

In one embodiment, the Y0 information bit(s) is(are) Precoding Matrix Indicator (PMI) information bit(s).

In one embodiment, the being correctly received includes performing decoding on a radio signal, and a result of the decoding passes CRC.

In one embodiment, the not being correctly received includes performing decoding on a radio signal, and a result of the decoding does not pass CRC.

In one embodiment, the being correctly received includes performing an energy detection on a radio signal within a duration, and an average value of a result of the detection within the duration exceeds a first given threshold.

In one embodiment, the not being correctly received includes performing an energy detection on a radio signal within a duration, and an average value of a result of the detection within the duration does not exceed a first given threshold.

In one embodiment, the being correctly received includes performing a blind detection on a radio signal, and a result of the blind detection passes CRC.

In one embodiment, the not being correctly received includes performing a blind detection on a radio signal, and a result of the blind detection does not pass CRC.

In one embodiment, the being correctly received includes performing a coherent detection on a radio signal, and signal energy obtained after the coherent detection exceeds a second given threshold.

In one embodiment, the not being correctly received includes performing a coherent detection on a radio signal, and signal energy obtained after the coherent detection does not exceed a second given threshold.

In one embodiment, the being correctly received includes respectively performing a blind detection and decoding on a radio signal, a result of the blind detection passes first CRC, and a result of the decoding passes second CRC.

In one embodiment, the not being correctly received includes respectively performing a blind detection and decoding on a radio signal, a result of the blind detection passes first CRC, and a result of the decoding does not pass second CRC.

In one embodiment, the first information is transmitted through the first-type channel in the present disclosure.

In one embodiment, the first information is transmitted through a Downlink Shared Channel (DL-SCH).

In one embodiment, the first information is transmitted through a PDCCH.

In one embodiment, the first information is transmitted through a PDSCH.

In one embodiment, the first information is Broadcast.

In one embodiment, the first information is Groupcast.

In one embodiment, the first information is Unicast.

In one embodiment, the first information is Cell-specific.

In one embodiment, the first information is UE-specific.

In one embodiment, the first information comprises all or part of a higher-layer signaling.

In one embodiment, the first information comprises all or part of an RRC signaling.

In one embodiment, the first information comprises one or more fields in an RRC IE.

In one embodiment, the first information comprises one or more fields in a SIB.

In one embodiment, the first information comprises all or part of a MAC layer signaling.

In one embodiment, the first information comprises one or more fields in a MAC CE.

In one embodiment, the first information comprises one or more fields in a PHY layer signaling.

In one embodiment, the first information comprises one or more fields in a piece of DCI.

In one embodiment, the first information comprises one or more fields in a DCI format.

In one embodiment, the first information is an RRC-layer signaling.

In one embodiment, the first information is an IE in an RRC-layer signaling.

In one embodiment, the first information is a field in an RRC IE.

In one embodiment, the first information is semi-statically configured.

In one embodiment, the first information is dynamically configured.

In one embodiment, the first information is used to determine the second information.

In one embodiment, the first information comprises a corresponding relation between the second information and the X first-type radio signals.

In one embodiment, the first information indicates that the Y first-type information bit(s) in the second information corresponds(correspond) to the X2 first-type radio signal(s) in the X first-type radio signals.

Embodiment 2

Figure 2:
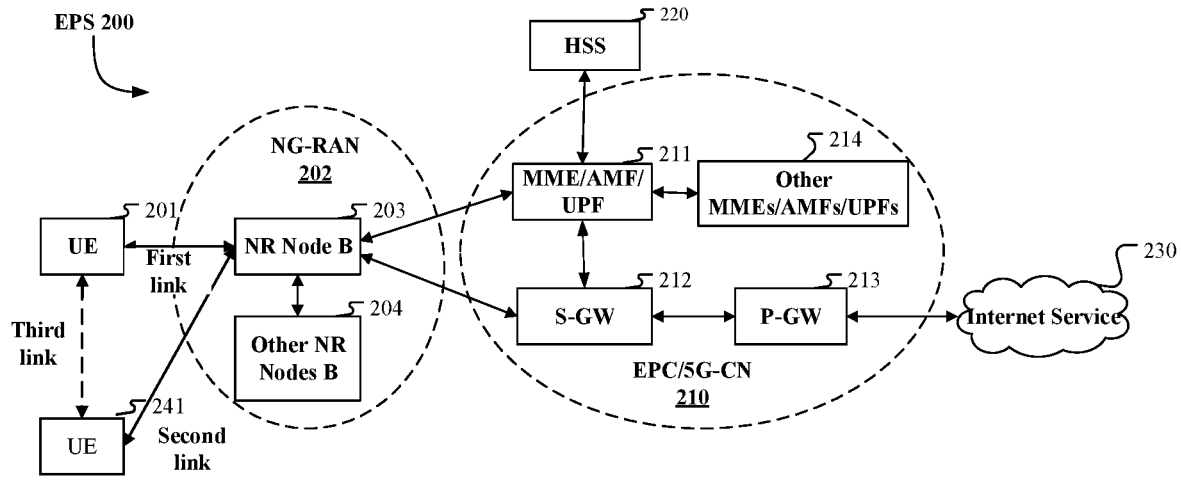
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, the second node in the present disclosure comprises the gNB 203.

In one embodiment, the third node in the present disclosure comprises the UE 201.

In one embodiment, the UE in the present disclosure comprises the UE 201.

In one embodiment, the base station in the present disclosure comprises the gNB 203.

In one embodiment, the UE 201 supports sidelink transmission.

In one embodiment, the UE 201 supports a PC5 interface.

In one embodiment, the UE 201 supports a Uu interface.

In one embodiment, the gNB 203 supports a Uu interface.

In one embodiment, a receiver of the first information in the present disclosure comprises the UE 201.

In one embodiment, a transmitter of the first information in the present disclosure comprises the gNB 203.

In one embodiment, a receiver of the first signaling in the present disclosure comprises the UE 201.

In one embodiment, a transmitter of the first signaling in the present disclosure comprises the gNB 203.

In one embodiment, a transmitter of the second information in the present disclosure comprises the UE 201.

In one embodiment, a receiver of the second information in the present disclosure comprises the gNB 203.

In one embodiment, a transmitter of the X first-type radio signals in the present disclosure comprises the UE 201.

In one embodiment, a receiver of the X first-type radio signals in the present disclosure comprises the UE 241.

In one embodiment, a transmitter of a second signaling in the present disclosure comprises the UE 201.

In one embodiment, a receiver of a second signaling in the present disclosure comprises the UE 241.

In one embodiment, a receiver of third information in the present disclosure comprises the UE 201.

In one embodiment, a transmitter of third information in the present disclosure comprises the UE 241.

Embodiment 3

Figure 3:
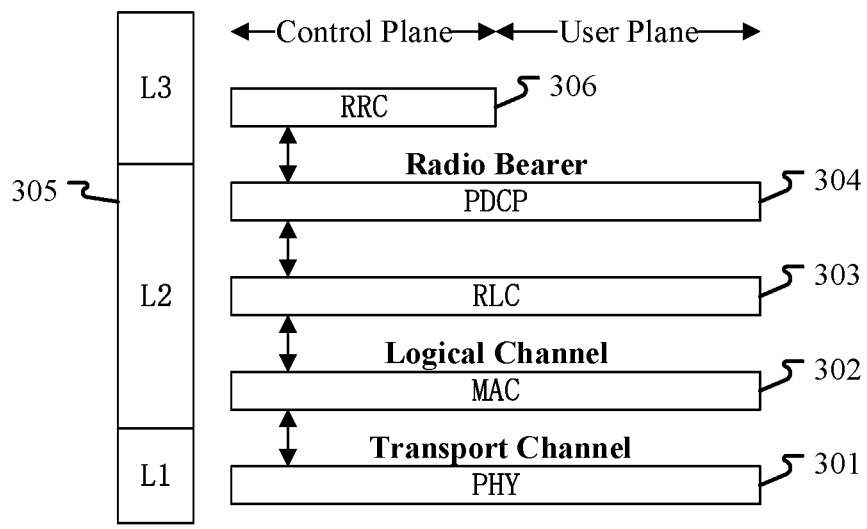
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. A layer above the layer 1 belongs to a higher layer. The L1 is called PHY 301 in the present disclosure. The layer 2 (L2) 305 is above the PHY 301, and is in charge of the link between the UE and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the base stations of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead, provides security by encrypting a packet, and provides support for UE handover between base stations. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the base station is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for obtaining radio resources (i.e., radio bearer) and configuring the lower layer using an RRC signaling between the base station and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC sublayer 306.

In one embodiment, the first signaling in the present disclosure is generated by the PHY 301.

In one embodiment, the second information in the present disclosure is generated by the PHY 301.

In one embodiment, the second signaling in the present disclosure is generated by the PHY 301.

In one embodiment, the X first-type radio signals in the present disclosure are generated by the PHY 301.

In one embodiment, the third information in the present disclosure is generated by the PHY 301.

Embodiment 4

Figure 4:
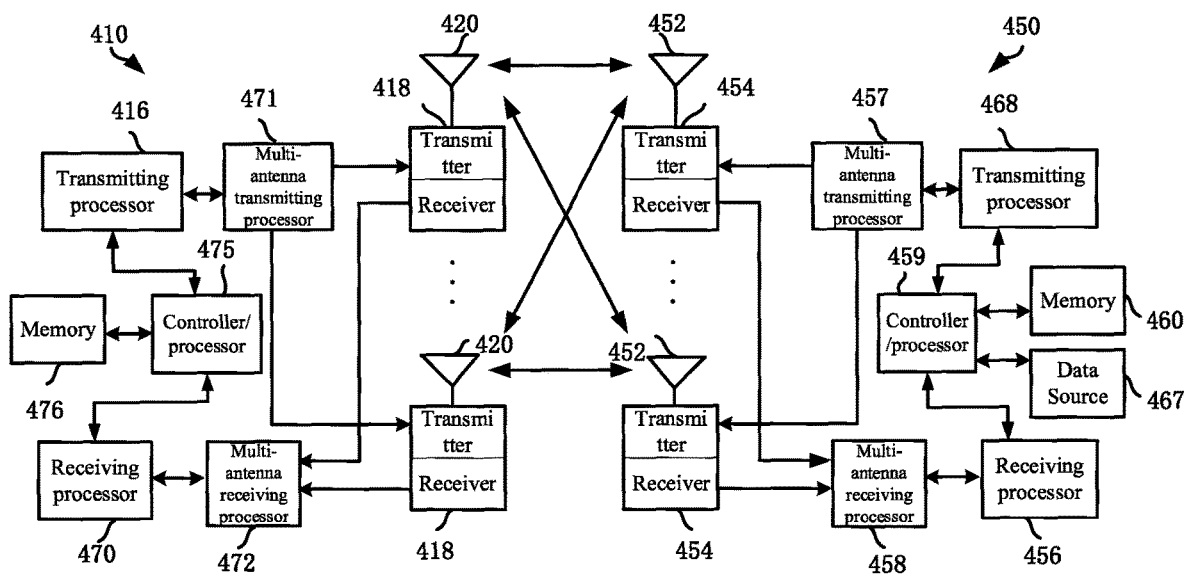
FIG. 4 illustrates a schematic diagram of a first node and a second node according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a base station.

In one subembodiment of the above embodiment, the first node is a UE, and the second node is a relay node.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one embodiment, the first node in the present disclosure comprises the second communication device 450, and the third node in the present disclosure comprises the first communication device 410.

In one subembodiment of the above embodiment, the first node is a UE, and the second node is a UE.

In one subembodiment of the above embodiment, the first node is a relay node, and the second node is a UE.

In one subembodiment of the above embodiment, the first node is a relay node, and the second node is a relay node.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives first information; receives a first signaling; transmits X first-type radio signals, X being a positive integer greater than 1; and transmits second information, the second information comprising Y first-type information bit(s), Y being a positive integer; the first information is used to determine the second information, and the first signaling is used to determine scheduling information of at least one of the X first-type radio signals; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface.

In one embodiment, the second communication device 450 comprises a memory that stores a computer readable instruction program. The computer readable instruction program generates an action when executed by at least one processor. The action includes: receiving first information; receiving a first signaling; transmitting X first-type radio signals, X being a positive integer greater than 1; and transmitting second information, the second information comprising Y first-type information bit(s), Y being a positive integer; the first information is used to determine the second information, and the first signaling is used to determine scheduling information of at least one of the X first-type radio signals; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits first information; transmits a first signaling; receives second information, and the second information comprises Y first-type information bit(s), Y being a positive integer; the first information is used to determine the second information, and the first signaling is used to determine scheduling information of at least one of X first-type radio signals, and the X first-type radio signals are transmitted by a target receiver of the first signaling; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface.

In one embodiment, the first communication device 410 comprises a memory that stores a computer readable instruction program. The computer readable instruction program generates an action when executed by at least one processor. The action includes: transmitting first information; transmitting a first signaling; receiving second information, the second information comprising Y first-type information bit(s), Y being a positive integer; the first information is used to determine the second information, and the first signaling is used to determine scheduling information of at least one of X first-type radio signals, and the X first-type radio signals are transmitted by a target receiver of the first signaling; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface.

In one embodiment, at least one of the antenna 452, the receiver 454, the multi-antenna receiving processor 458, the receiving processor 456, the controller/processor 459, the memory 460, or the data source 467 is used to receive the first information in the present disclosure.

In one embodiment, the antenna 452, the receiver 454, the multi-antenna receiving processor 458, the receiving processor 456, the controller/processor 459, the memory 460, and the data source 467 are used to receive the first information in the present disclosure.

In one embodiment, at least one of the antenna 452, the receiver 454, the multi-antenna receiving processor 458, the receiving processor 456, the controller/processor 459, the memory 460, or the data source 467 is used to receive the first signaling in the present disclosure.

In one embodiment, the antenna 452, the receiver 454, the multi-antenna receiving processor 458 and the receiving processor 456 are used to receive the first signaling in the present disclosure.

In one embodiment, at least one of the antenna 452, the transmitter 454, the multi-antenna transmission processor 458, the transmitting processor 468, the controller/processor 459, the memory 460, or the data source 467 is used to transmit the X first-type radio signals in the present disclosure, X being a positive integer greater than 1.

In one embodiment, the antenna 452, the transmitter 454, the multi-antenna transmitting processor 458 and the transmitting processor 468 are used to transmit the X first-type radio signals in the present disclosure, X being a positive integer.

In one embodiment, at least one of the antenna 452, the transmitter 454, the multi-antenna transmitting processor 458, the transmitting processor 468, the controller/processor 459, the memory 460, or the data sources 467 is used to transmit the second information in the present disclosure.

In one embodiment, at least one of the antenna 452, the transmitter 454, the multi-antenna transmitting processor 458 or the transmitting processor 468 is used to transmit the second information in the present disclosure.

In one embodiment, at least one of the antenna 452, the transmitter 454, the multi-antenna transmitting processor 458, the transmitting processor 468, the controller/processor 459, the memory 460, or the data sources 467 is used to determine the second information in the present disclosure.

In one embodiment, at least one of the antenna 452, the transmitter 454, the multi-antenna transmitting processor 458 or the transmitting processor 468 is used to determine the second information in the present disclosure.

In one embodiment, at least one of the antenna 452, the receiver 454, the multi-antenna receiving processor 458, the receiving processor 456, the controller/processor 459, the memory 460, or the data source 467 is used to receive the third information in the present disclosure.

In one embodiment, the antenna 452, the receiver 454, the multi-antenna receiving processor 458 and the receiving processor 456 are used to receive the third information in the present disclosure.

In one embodiment, at least one of the antenna 452, the transmitter 454, the multi-antenna transmitting processor 458, the transmitting processor 468, the controller/processor 459, the memory 460, or the data sources 467 is used to transmit the second signaling in the present disclosure.

In one embodiment, the antenna 452, the transmitter 454, the multi-antenna transmitting processor 458 and the transmitting processor 468 are used to transmit the second signaling in the present disclosure.

In one embodiment, at least one of the antenna 420, the transmitter 418, the multi-antenna transmitting processor 471, the transmitting processor 416, the controller/processor 475, or the memory 476 is used to transmit the first information in the present disclosure.

In one embodiment, the antenna 420, the transmitter 418, the multi-antenna transmitting processor 471, the transmitting processor 416, the controller/processor 475, and the memory 476 are used to transmit the first information in the present disclosure.

In one embodiment, at least one of the antenna 420, the transmitter 418, the multi-antenna transmitting processor 471, the transmitting processor 416, the controller/processor 475, or the memory 476 is used to transmit the first signaling in the present disclosure.

In one embodiment, the antenna 420, the transmitter 418, the multi-antenna transmitting processor and the transmitting processor 416 are used to transmit the first signaling in the present disclosure.

In one embodiment, at least one of the antenna 420, the receiver 418, the multi-antenna receiving processor 472, the receiving processor 470, the controller/processor 475, or the memory 476 is used to receive the second information in the present disclosure.

In one embodiment, the antenna 420, the receiver 418, the multi-antenna receiving processor 472 and the receiving processor 470 are used to receive the second information in the present disclosure.

In one embodiment, at least one of the antenna 420, the receiver 418, the multi-antenna receiving processor 472, the receiving processor 470, the controller/processor 475, or the memory 476 is used to receive the second signaling in the present disclosure.

In one embodiment, the antenna 420, the receiver 418, the multi-antenna receiving processor 472 and the receiving processor 470 are used to receive the second signaling in the present disclosure.

In one embodiment, at least one of the antenna 420, the receiver 418, the multi-antenna receiving processor 472, the receiving processor 470, the controller/processor 475, or the memory 476 is used to receive the X first-type radio signals in the present disclosure.

In one embodiment, the antenna 420, the receiver 418, the multi-antenna receiving processor 472 and the receiving processor 470 are used to receive the X first-type radio signals in the present disclosure.

In one embodiment, at least one of the antenna 420, the transmitter 418, the multi-antenna transmitting processor 471, the transmitting processor 416, the controller/processor 475, or the memory 476 is used to transmit the third information in the present disclosure.

In one embodiment, the antenna 420, the transmitter 418, the multi-antenna transmitting processor and the transmitting processor 416 are used to transmit the third information in the present disclosure.

Embodiment 5

Figure 5:
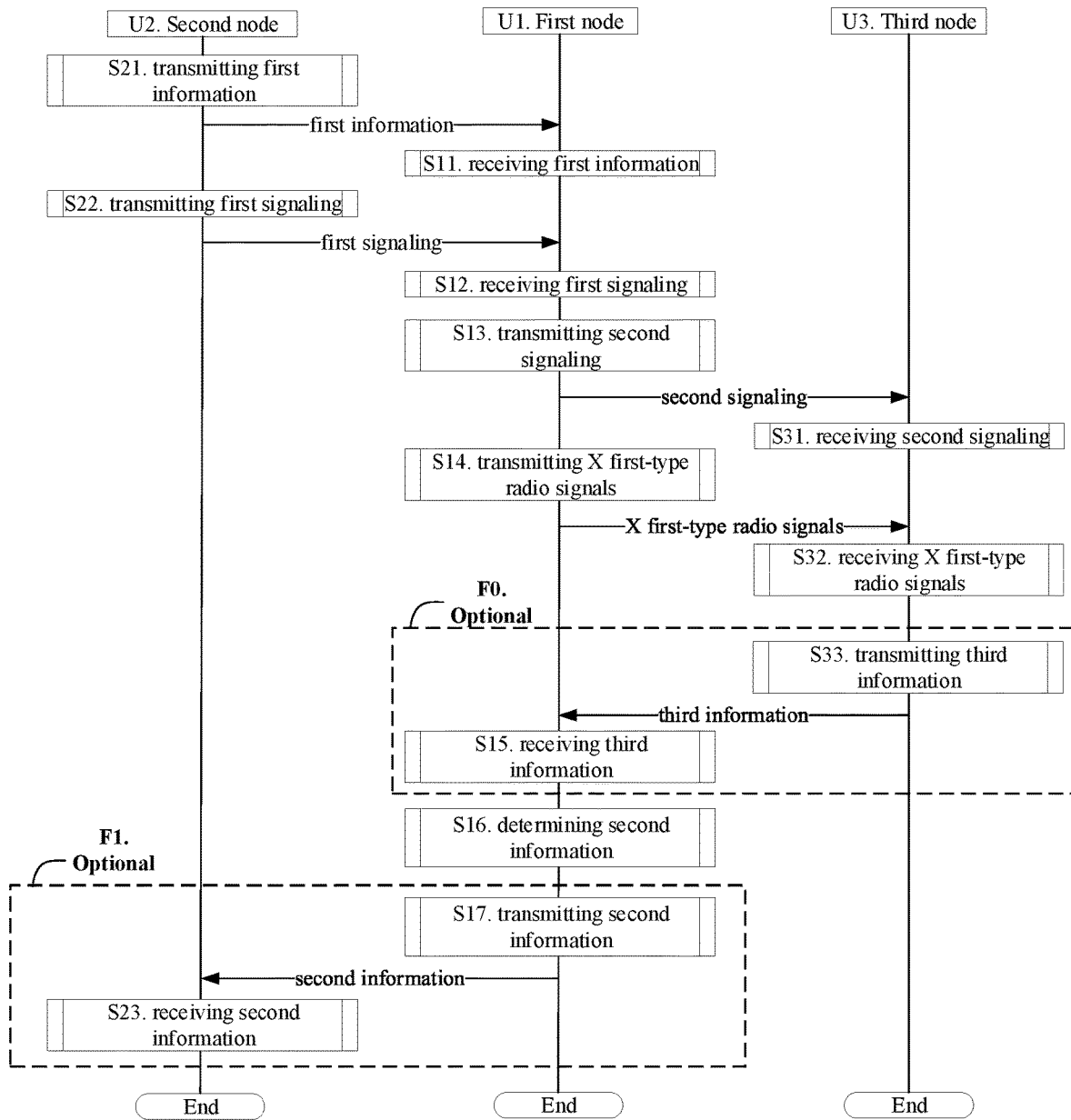
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a first node U1 and a second node U2 are communication nodes transmitted via a first-type radio interface, and the first node U1 and a third node U3 are communication nodes transmitted via a second-type radio interface. In FIG. 5, steps respectively marked by the dotted boxes F0 and the F1 are optional.

The first node U1 transmits first information in step S11; receives a first signaling in step S12; transmits a second signaling in step S13; transmits X first-type radio signals in step S14; receives third information in step S15; determines second information in step S16; and transmits second information in step S17.

The second node U2 transmits first information in step S21; transmits a first signaling in step S22; and receives second information in step S23.

The third node U3 receives a second signaling in step S31; receives X first-type radio signals in step S32; and transmits third information in step S33.

In Embodiment 5, the X is a positive integer greater than 1; the second information comprises Y first-type information bit(s), Y being a positive integer; the first information is used to determine the second information, and the first signaling is used to determine scheduling information of at least one of the X first-type radio signals; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface; the Y first-type information bit(s) is(are) divided into Y1 bit-group(s); a transmitter of the third information is the same as a target receiver of at least one of the X first-type radio signals; the third information is used to generate the second information.

In one embodiment, the first information is used to determine the mapping between the Y first-type information bit(s) in the second information and the X first-type radio signals.

In one embodiment, the first information is used to determine the Y.

In one embodiment, the first information is used to determine the mapping between the Y first-type information bit(s) in the second information and the X first-type radio signals as well as the Y.

In one embodiment, there exists one bit-group in the Y1 bit-group(s) being used to indicate whether at least one of the X first-type radio signals is correctly received.

In one embodiment, there exists one bit-group in the Y1 bit-group(s) being used to indicate whether at least one of the X first-type radio signals is not correctly received.

In one embodiment, the third information is used to indicate whether at least one of the X first-type radio signals is correctly received.

In one embodiment, the third information is used to indicate whether at least one of the X first-type radio signals is not correctly received.

In one embodiment, a first bit block is used to generate any of the X first-type radio signals, and the first bit block comprises at least one bit; RVs of the X first-type radio signals are the same, or a time-domain position of time-domain resources occupied by a first-type radio signal of the X first-type radio signals is used to determine an RV of the first-type radio signal.

In one embodiment, X bit blocks are respectively used to generate the X first-type radio signals, and any of the X bit blocks comprises at least one bit; the X first-type radio signals respectively correspond to X HARQ processes, the X bit blocks respectively belong to the X HARQ processes, a first HARQ process is one of the X HARQ processes, a time-domain position of time-domain resources occupied by a first-type radio signal of the X first-type radio signals corresponding to the first HARQ process is used to determine a signature identity of the first HARQ process.

In one embodiment, a target receiver of any of the X first-type radio signals is the third node U3, and a target receiver of the second information is the second node U2.

In one embodiment, a transmitter of the third information is the third node U3, and a target receiver of at least one of the X first-type radio signals is the third node U3.

In one embodiment, steps in box F0 and box F1 in FIG. 5 exist simultaneously.

In one embodiment, steps in box F0 and box F1 in FIG. 5 do not exist simultaneously.

In one embodiment, steps in box F0 in FIG. 5 exist, while steps in box F1 do not exist.

In one embodiment, if at least one of the X first-type radio signals is correctly received, steps in box F0 and box F1 in FIG. 5 do not exist.

In one embodiment, if at least one of the X first-type radio signals is correctly received, steps in box F0 in FIG. 5 exist, while steps in box F1 do not exist.

In one embodiment, if at least one of the X first-type radio signals is not correctly received, steps in box F0 in FIG. 5 and box F1 exist simultaneously.

In one embodiment, the first-type air interface is a Uu interface.

In one embodiment, the first-type air interface comprises a downlink and an uplink.

In one embodiment, the first-type air interface comprises a radio interface between a UE and a base station.

In one embodiment, the first-type air interface comprises a radio interface between a UE and a relay node.

In one embodiment, the first-type air interface comprises a radio interface between a UE and a gNB.

In one embodiment, the first information, the first signaling and the second information are all transmitted via the first-type air interface.

In one embodiment, the first information and the first signaling are transmitted via a downlink, and the second information is transmitted via an uplink.

In one embodiment, the second-type air interface is a PC5 interface.

In one embodiment, the second-type air interface comprises a sidelink.

In one embodiment, the second-type air interface comprises a radio interface between UEs.

In one embodiment, the second-type air interface comprises a radio interface between a UE and a relay node.

In one embodiment, the X first-type radio signals are transmitted via the second-type air interface.

In one embodiment, the X first-type radio signals, the second signaling and the third information are all transmitted via a second-type air interface.

In one embodiment, the X first-type radio signals, the second signaling and the third information are all transmitted via a sidelink.

In one embodiment, the third information is transmitted through a PSFCH.

In one embodiment, the third information is transmitted through a PSCCH.

In one embodiment, the third information is transmitted through a PSSCH.

In one embodiment, the third information is Broadcast.

In one embodiment, the third information is Groupcast.

In one embodiment, the third information is Unicast.

In one embodiment, the third information is UE-specific.

In one embodiment, the third information comprises all or part of a higher-layer signaling.

In one embodiment, the third information comprises one or more fields of a PHY layer signaling.

In one embodiment, the third information comprises one or more fields in a piece of SCI.

In one embodiment, a transmitter of the third information is the third node U3.

In one embodiment, a transmitter of the third information is a UE.

In one embodiment, a transmitter of the third information is a relay node.

In one embodiment, a target receiver of at least one of the X first-type radio signals is the third node U3, and a transmitter of the third information is the third node U3.

In one embodiment, a target receiver of only one of the X first-type radio signals is the third node U3, and a transmitter of the third information is the third node U3.

In one embodiment, a target receiver of any one of the X first-type radio signals is the third node U3, and a transmitter of the third information is the third node U3.

In one embodiment, a transmitter of the third information and a target receiver of at least one of the X first-type radio signals are both a same UE.

In one embodiment, a transmitter of the third information and a target receiver of at least one of the X first-type radio signals are both a same relay node.

In one embodiment, the third information explicitly indicates whether at least one of the X first-type radio signals is correctly received.

In one embodiment, the third information implicitly indicates whether at least one of the X first-type radio signals is correctly received.

In one embodiment, the third information comprises Z HARQ-ACK information bits, Z being a positive integer equal to the X, the Z HARQ-ACK information bits respectively correspond to the X first-type radio signals, a second information bit is one of the Z HARQ-ACK information bits, and a fourth radio signal is one of the X first-type radio signals corresponding to the second information bit; if the fourth radio signal is not correctly received, the second information bit is a NACK; if the fourth radio signal is correctly received, the second information is an ACK.

In one embodiment, the third information comprises Z HARQ-ACK information bit(s), Z being a positive integer less than the X, any of the Z HARQ-ACK information bit(s) corresponds to at least one of the X first-type radio signals, a third information bit is one of the Z HARQ-ACK information bit(s), and a fifth radio signal is one of the X first-type radio signals corresponding to the third information bit; if the fifth radio signal is not correctly received, the third information bit is a NACK; if the fifth radio signal is correctly received, the third information is an ACK.

In one embodiment, the third information explicitly indicates whether at least one of the X first-type radio signals is not correctly received.

In one embodiment, the third information implicitly indicates whether at least one of the X first-type radio signals is not correctly received.

In one embodiment, the third information only indicates that at least one of the X first-type radio signals is not correctly received.

In one embodiment, the third information only comprises a NACK information bit and does not comprise an ACK information bit.

In one embodiment, the third information comprises Z1 NACK information bit(s), Z1 being a positive integer not greater than the X1, the Z1 NACK information bit(s) corresponds (respectively correspond) to Z1 first-type radio signal(s) in the X first-type radio signals; a fourth information bit is one of the Z1 NACK information bit(s), a sixth radio signal is one of the X first-type radio signals corresponding to the fourth information bit, and the fourth information bit represents that the sixth radio signal is not correctly received.

In one embodiment, the third information comprises a NACK information bit, and the third information is used to indicate that at least one of the X first-type radio signals is not correctly received.

In one embodiment, the third information comprises a NACK information bit, a seventh radio signal is one of the X first-type radio signals, and the third information is used to indicate whether the seventh radio signal is correctly received; if the seventh radio signal is not correctly received, the third information is transmitted; if the seventh radio signal is correctly received, transmission of the third information is dropped.

In one embodiment, a position of the seventh radio signal in the X first-type radio signals is used to determine time-frequency resources of the third information.

In one embodiment, the second information comprises the third information.

In one embodiment, the second information comprises all or part of bits in the third information.

In one embodiment, the second information only comprises part of bits in the third information.

In one embodiment, the second information comprises the Z HARQ-ACK information bit(s) in the third information.

In one embodiment, at least one of the Z HARQ-ACK information bit(s) in the third information is not used to generate the second information.

In one embodiment, at least one of the Z HARQ-ACK information bit(s) in the third information does not belong to the Y first-type information bit(s).

In one embodiment, the second information comprises the Z1 NACK information bit(s) in the third information.

In one embodiment, the third information is used to generate the second information.

In one embodiment, the Y first-type information bit(s) comprises(comprise) the Z HARQ-ACK information bit(s) in the third information.

In one embodiment, the Y first-type information bit(s) does(do) not comprise at least one of the Z HARQ-ACK information bit(s) in the third information.

In one embodiment, the Y first-type information bit(s) comprises(comprise) the Z1 NACK information bit(s) in the third information.

In one embodiment, the Y first-type information bit(s) does(do) not comprise at least one of the Z1 NACK information bit(s) in the third information.

In one embodiment, the Z HARQ-ACK(s) obtains(obtain) the Y first-type information bit(s) through coding.

In one embodiment, the Z1 NACK(s) obtains(obtain) the Y first-type information bit(s) through coding.

In one embodiment, the second signaling is transmitted through a PSCCH.

In one embodiment, the second signaling is Broadcast.

In one embodiment, the second signaling is Groupcast.

In one embodiment, the second signaling is Unicast.

In one embodiment, the second signaling is UE-specific.

In one embodiment, the second signaling comprises one or more fields in a PHY layer signaling.

In one embodiment, the second signaling comprises one or more fields in a piece of SCI.

In one embodiment, the second signaling comprises the scheduling information of at least one of the X first-type radio signals.

In one embodiment, the second signaling comprises scheduling information of any of the X first-type radio signals.

In one embodiment, the second signaling comprises scheduling information of all of the X first-type radio signals.

In one embodiment, scheduling information of only one of the X first-type radio signals is determined by the second signaling.

In one embodiment, the second signaling indicates time-frequency resources occupied by at least one of the X first-type radio signals.

In one embodiment, the second signaling indicates an MCS adopted by at least one of the X first-type radio signals.

In one embodiment, the second signaling indicates an RV adopted by at least one of the X first-type radio signals.

In one embodiment, the second signaling indicates occupied time-frequency resources and an adopted MCS of at least one of the X first-type radio signals.

In one embodiment, the second signaling indicates occupied time-frequency resources and an adopted RV of at least one of the X first-type radio signals.

In one embodiment, the second signaling indicates an adopted MCS and an adopted RV of at least one of the X first-type radio signals.

In one embodiment, the second signaling indicates occupied time-frequency resources, an adopted MCS and an adopted RV of at least one of the X first-type radio signals.

In one embodiment, the second signaling comprises three second-type fields, and the three second-type fields are respectively used to indicate occupied time-frequency resources, an adopted MCS and an adopted RV of at least one of the X first-type radio signals.

In one embodiment, the second signaling comprises at least one second-type field, and the at least one second-type field is(are respectively) used to indicate occupied time-frequency resources, an adopted MCS and an adopted RV of all of the X first-type radio signals.

In one embodiment, the second signaling comprises at least one second-type field, and the at least one second-type field is(are) used to indicate scheduling information of at least one of the X first-type radio signals.

In one embodiment, a CRC code of the second signaling is used to indicate scheduling information of at least one of the X first-type radio signals.

In one embodiment, a DMRS of the second signaling is used to indicate scheduling information of at least one of the X first-type radio signals.

In one embodiment, the first signaling comprises at least one third-type field, and at least one of the at least one third-type field is carried by the second signaling.

In one embodiment, information carried by the second signaling comprises a first field, and the first field is one of at least one third-type field comprised in the first signaling.

In one embodiment, the first field comprises the scheduling information of at least one of the X first-type radio signals.

In one embodiment, the first field comprises a DMRS adopted by at least one of the X first-type radio signals.

In one embodiment, a target receiver of the third signaling is the third node U3.

In one embodiment, a target receiver of the second signaling is a UE.

In one embodiment, a target receiver of the second signaling is a relay node.

In one embodiment, a target receiver of the second signaling and a target receiver of at least one of the X first-type radio signals are the third node U3.

In one embodiment, target receivers of the second signaling and any of the X first-type radio signals are the third node U3.

In one embodiment, target receivers of the second signaling and only one of the X first-type radio signals are both the third node U3.

In one embodiment, a target receiver of the second signaling and a target receiver of at least one of the X first-type radio signals are both UEs.

In one embodiment, a target receiver of the second signaling and a target receiver of at least one of the X first-type radio signals are both relay nodes.

In one embodiment, the second signaling is used to indicate time-frequency resources occupied by the third information.

In one embodiment, the second signaling is used to indicate time-domain resources occupied by the third information.

In one embodiment, the second signaling is used to indicate frequency-domain resources occupied by the third information.

In one embodiment, the second signaling is used to indicate a time interval between a time for receiving at least one of the X first-type radio signals and a time for transmitting the third information.

In one embodiment, the second signaling is used to indicate a time interval between a time for transmitting at least one of the X first-type radio signals and a time for receiving the third information.

Embodiment 6

Figure 6:
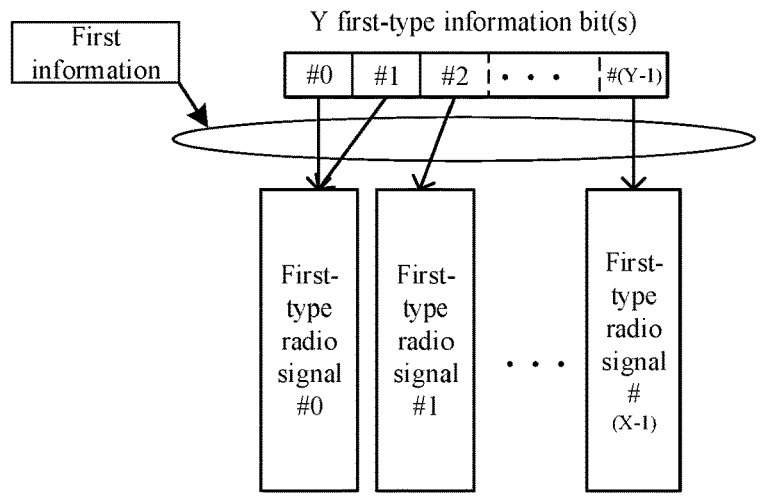
FIG. 6 illustrates a schematic diagram of relations among first information, Y piece(s) of first-type information and X first-type radio signals according to one embodiment of the present disclosure.

Embodiment 6 illustrates a schematic diagram of relations among first information, Y piece(s) of first-type information and X first-type radio signals according to one embodiment of the present disclosure, as shown in FIG. 6. In FIG. 6, the ellipse block represents the mapping between the Y first-type information bit(s) in the second information and the X first-type radio signals.

In Embodiment 6, the first information is used to determine the mapping between the Y first-type information bit(s) in the second information and the X first-type radio signals.

In one embodiment, the first information is used to determine the Y.

In one embodiment, the first information is used to determine the mapping between the Y first-type information bit(s) in the second information and the X first-type radio signals as well as the Y.

In one embodiment, the first information is used to determine a transmission format of the second information.

In one embodiment, the first information is used to determine a number of all information bits in the second information.

In one embodiment, the first information is used to determine the X.

In one embodiment, the first information indicates a number of the Y first-type information bit(s) comprised in the second information, that is, the first information indicates the Y.

In one embodiment, the first information and the first signaling are used together to determine the second information.

In one embodiment, the first information is used to determine the mapping between the Y first-type information bit(s) in the second information and the X first-type radio signals, and the first signaling is used to determine the Y.

In one embodiment, the first information is used to determine the Y, and the first signaling is used to determine the mapping between the Y first-type information bit(s) in the second information and the X first-type radio signals.

In one embodiment, the first information is used to determine the mapping between the Y first-type information bit(s) in the second information and the X first-type radio signals as well as the Y.

In one embodiment, the first information is used to indicate the mapping between the Y first-type information bit(s) and the X first-type radio signals, and the first signaling is used to indicate the Y.

In one embodiment, the first information is used to indicate the Y, and the first signaling is used to indicate the mapping between the Y first-type information bit(s) and the X first-type radio signals.

In one embodiment, the first information and the first signaling are used together to determine the Y.

In one embodiment, the first information and the first signaling are used together to determine whether the Y first-type information bit(s) in the second information is(are) used to indicate an HARQ-ACK.

In one embodiment, the first information and the first signaling are used together to determine whether the Y first-type information bit(s) in the second information is(are) only used to indicate a NACK.

In one embodiment, the first information is used to indicate a transmission format of the second information, and the first signaling is used to indicate the mapping between the Y first-type information bit(s) and the X first-type radio signals.

In one embodiment, the first information is used to determine a number of all first-type information bits in the second information, and the first signaling is used to indicate the mapping between the Y first-type information bit(s) and the X first-type radio signals.

In one embodiment, the first information is used to indicate the X, and the first signaling is used to indicate the mapping between the Y first-type information bit(s) and the X first-type radio signals.

In one embodiment, the mapping relation refers to one or more of the Y first-type information bits correspond to one of the X first-type radio signals.

In one embodiment, the mapping relations refer to one or more of the Y first-type information bits are used to indicate whether one of the X first-type radio signals is correctly received.

In one embodiment, the mapping relations refer to one or more of the Y first-type information bits are used to indicate whether one of the X first-type radio signals is not correctly received.

In one embodiment, if the X is equal to the Y, the Y first-type information bits respectively correspond to the X first-type radio signals.

Embodiment 7

Figure 7:
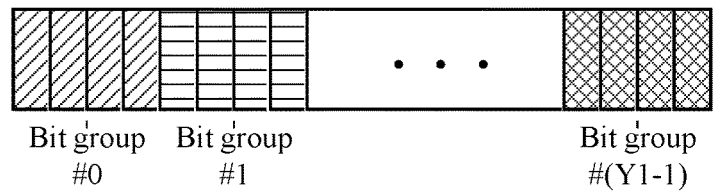
FIG. 7 illustrates a schematic diagram of relation(s) of Y1 bit-group(s) according to one embodiment of the present disclosure.
Figure 7:
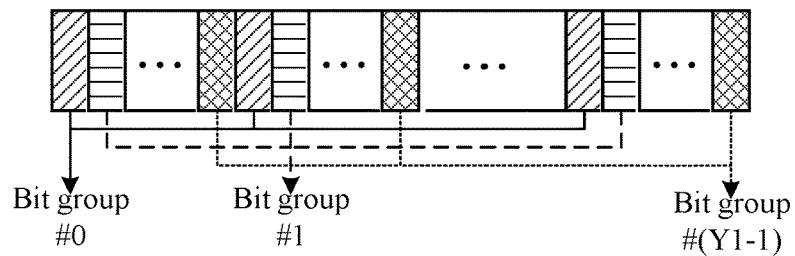

Embodiment 7 illustrates a schematic diagram of relation(s) among Y1 bit-group(s) according to one embodiment of the present disclosure, as shown in FIG. 7. In FIG. 7, each filled small-solid-line-framed box represents one of the Y first-type information bit(s) in the present disclosure; the Y1 bit-group(s) in the present disclosure is(are) respectively) numbered as bit-group #0, bit-group #1, . . . , bit-group #(Y1-1); the slash-filled small-solid-line-framed box represents bit-group #0, the horizontal-line small-solid-line-framed box represents bit-group #1 and the cross-line-filled small-solid-line-framed box represents bit-group #(Y1-1).

In Embodiment 7, the Y first-type information bit(s) is(are respectively) divided into Y1 bit-group(s), the Y1 bit-group(s) is(are) arranged in order, and any of the Y1 bit-group(s) comprises at least one first-type information bit arranged in order, as shown in case A in FIG. 7.

In Embodiment 7, the Y first-type information bit(s) is(are) divided into Y1 bit-group(s), any of the Y1 bit-group(s) comprises at least one first-type information bit, and first-type information bit(s) from different bit-group(s) is(are) arranged in order, as shown in case B in FIG. 7.

In one embodiment, the Y1 bit-group(s) is(are) used to indicate whether at least one of the X first-type radio signals is correctly received.

In one embodiment, the Y1 bit-group(s) is(are) used to indicate whether at least one of the X first-type radio signals is not correctly received.

In one embodiment, there exist a first bit-group and a second bit-group in the Y1 bit-groups, and at least one first-type information bit in the first bit-group and at least one first-type information bit in the second bit-group are arranged in order.

In one embodiment, there exists one bit-group in the Y1 bit-group(s) being used to indicate whether at least one of the X first-type radio signals is correctly received.

In one embodiment, there exists one bit-group in the Y1 bit-group(s) being used to indicate whether at least one of the X first-type radio signals is not correctly received.

In one embodiment, any of the Y1 bit-group(s) only comprises a first-type information bit.

In one embodiment, at least one of the X first-type radio signals comprises at least one second-type bit block.

In one embodiment, any of the at least one second-type bit block comprises a CB.

In one embodiment, any of the at least one second-type bit block comprises a CBG.

In one embodiment, any of the at least one second-type bit block comprises a TB.

In one embodiment, any of the at least one of second-type bit block is obtained by a TB through TB-level CRC attachment.

In one embodiment, any of the at least one second-type bit block is a CB in code block obtained by one TB sequentially subjected to TB-level CRC attachment, code block Segmentation, and code block-level CRC attachment.

In one embodiment, any of the at least one second-type bit block is a CBG in code block obtained by one TB sequentially subjected to TB-level CRC attachment, code block Segmentation, and code block-level CRC attachment.

In one embodiment, a third bit-group is one of the Y1 bit-group(s), the third bit-group comprises at least one first-type information bit, the third bit-group is used to indicate whether at least one of the X first-type radio signals is correctly received, and at least one first-type information bit comprised in the third bit-group corresponds(respectively correspond) to at least one second-type bit block comprised in the first-type radio signal.

In one embodiment, if one of at least one second-type bit block comprised in the first-type radio signal is correctly received, a first-type information corresponding to the second-type bit block in the third bit-group is an ACK; if one of at least one second-type bit block comprised in the first-type radio signal is not correctly received, a first-type information bit corresponding to the second-type bit block in the third bit-group is a NACK.

In one embodiment, any first-type information bit in the third bit-group is used to indicate whether a second-type bit block in the first-type radio signal is correctly received; if a second-type bit block in the first-type radio signal is correctly received, the first-type information bit corresponding to the second-type bit block in the third bit-group is an ACK; if a second-type bit block in the first-type radio signal is not correctly received, the first-type information bit corresponding to the second-type bit block in the third bit-group is a NACK.

In one embodiment, any first-type information bit in the third bit-group is used to indicate that a second-type bit block of the first-type radio signal is not correctly received.

Embodiment 8

Figure 8:
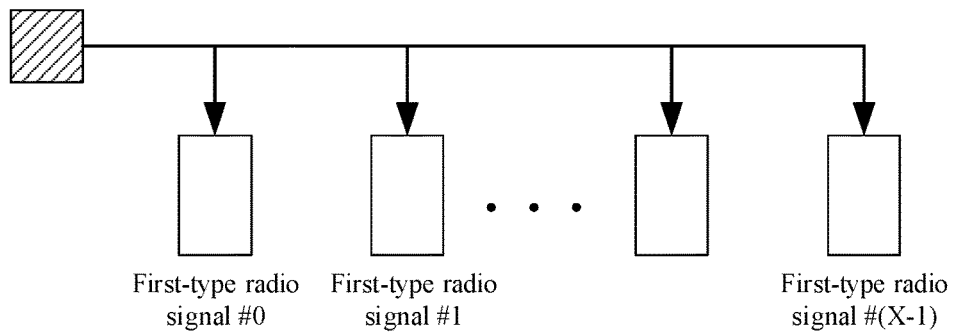
FIG. 8 illustrates a schematic diagram of relations among a first bit block and X first-type radio signals according to one embodiment of the present disclosure.

Embodiment 8 illustrates a schematic diagram of relations among a first bit block and X first-type radio signals according to one embodiment of the present disclosure, as shown in FIG. 8. In FIG. 8, the slash-filled box represents the first bit block in the present disclosure; the unfilled box represents one of the X first-type radio signals in the present disclosure; the X first-type radio signals in the present disclosure are respectively numbered as first-type radio signal #0, first-type radio signal #1, ..., first-type radio signal #(X−1).

In Embodiment 8, the first bit block is used to generate any of the X first-type radio signals, and the first bit block comprises at least one bit.

In one embodiment, RVs of the X first-type radio signals are the same.

In one embodiment, a time-domain position of time-domain resources occupied by a first-type radio signal of the X first-type radio signals is used to determine an RV of the first-type radio signal.

In one embodiment, any of the X first-type radio signals comprises a first bit block, and the first bit block comprises at least one bit arranged in order.

In one embodiment, the first bit block comprises one Code Block Group (CBG).

In one embodiment, the first bit block comprises one Transport Block (TB).

In one embodiment, the first bit block is obtained by one TB subjected to a TB-level CRC attachment.

In one embodiment, the first bit block is one of CB(s) obtained by one TB sequentially subjected to TB-level CRC attachment, CB Segmentation, and CB-level CRC attachment.

In one embodiment, one of the X first-type radio signals is obtained by all or part of bits of the first bit block through the first preprocessing in the present disclosure.

In one embodiment, one of the X first-type radio signals is obtained by all or part of bits of the first bit block through the second preprocessing in the present disclosure.

In one embodiment, any of the X first-type radio signals is an output of all or part of bits of the first bit block through the first preprocessing in the present disclosure.

In one embodiment, any of the X first-type radio signals is an output of all or part of bits of the first bit block through the second preprocessing in the present disclosure.

In one embodiment, only the first bit block is used to generate one of the X first-type radio signals.

In one embodiment, there exists a bit block other than the first bit block being used to generate one of the X first-type radio signals.

In one embodiment, the first bit block is used to generate X first-type code blocks, any of the X first-type code blocks comprises code bits arranged in order, and the X first-type code blocks are respectively used to generate the X first-type radio signals.

In one embodiment, the X first-type code blocks comprises two completely identical first-type code blocks.

In one embodiment, the X first-type code blocks comprises two different first-type code blocks.

In one embodiment, any of the X first-type code blocks corresponds to an RV.

In one embodiment, the X first-type code blocks corresponds to a same RV.

In one embodiment, the X first-type code blocks respectively correspond to X RVs.

In one embodiment, a time-domain position of time-domain resources occupied by one of the X first-type radio signals is used to determine one of the X RVs.

In one embodiment, a time-domain position of time-domain resources occupied by one of the X first-type radio signals is used to determine one of the X first-type code blocks.

In one embodiment, a slot in which time-domain resources occupied by one of the X first-type radio signals is located is used to determine one of the X first-type code blocks.

In one embodiment, a subframe in which time-domain resources occupied by one of the X first-type radio signals is located is used to determine one of the X first-type code blocks.

In one embodiment, the X first-type radio signals all belong to a second HARQ Process.

In one embodiment, the X first-type radio signals correspond to the second HARQ Process Identity.

In one embodiment, the first bit block is processed by the second HARQ process.

In one embodiment, the second HARQ process is synchronous.

In one embodiment, the second HARQ process is asynchronous.

In one embodiment, the second HARQ process is adaptive.

In one embodiment, the second HARQ process is non-adaptive.

In one embodiment, an earliest transmitted one of the X first-type radio signals is a first transmission of the first bit block, and all first-type radio signals other than the earliest transmitted one of the X first-type radio signals are all retransmissions of the first bit block.

In one embodiment, a first transmission of the first bit block is earlier than any of the X first-type radio signals, and the X first-type radio signals are all retransmissions of the first bit block.

Embodiment 9

Figure 9:
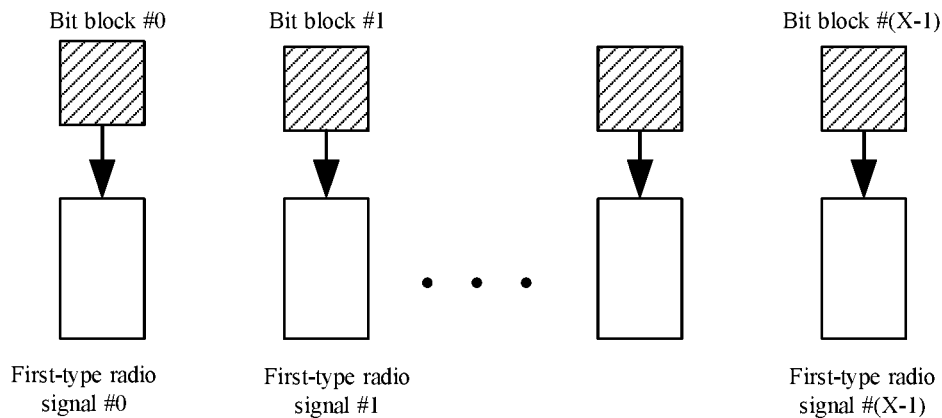
FIG. 9 illustrates a schematic diagram of relations among X bit blocks and X first-type radio signals according to one embodiment of the present disclosure.

Embodiment 9 illustrates a schematic diagram of relations among X bit blocks and X first-type radio signals according to one embodiment of the present disclosure, as shown in FIG. 9. In FIG. 9, the slash-filled box represents one of the X bit blocks, and the X bit blocks are respectively numbered as: bit block #0, bit block #1, . . . , bit block #(X−1); the unfilled box represents one of the X first-type radio signals, and the X first-type radio signals are respectively numbered as: first-type radio signal #0, first-type radio signal #1, . . . , first-type radio signal #(X−1).

In Embodiment 9, the X bit blocks are respectively used to generate the X first-type radio signals, and any of the X bit blocks comprises at least one bit; the X first-type radio signals respectively correspond to X HARQ processes, the X bit blocks respectively belong to the X HARQ processes, a first HARQ process is one of the X HARQ processes, a time-domain position of time-domain resources occupied by a first-type radio signal of the X first-type radio signals corresponding to the first HARQ process is used to determine a signature identity of the first HARQ process.

In one embodiment, the X first-type radio signals respectively comprise X bit blocks, and any of the X bit blocks comprises at least one bit arranged in order.

In one embodiment, the X bit blocks are different.

In one embodiment, there exist two of the X bit blocks being the same.

In one embodiment, there exist partial bits of two of the X bit blocks being the same.

In one embodiment, any of the X bit blocks comprises a CB.

In one embodiment, any of the X bit blocks comprises a CBG.

In one embodiment, any of the X bit blocks comprises a TB.

In one embodiment, any of X bit blocks is obtained by a TB through TB-level CRC attachment.

In one embodiment, any of X bit blocks is one of CB(s) obtained by one TB sequentially subjected to TB-level CRC attachment, code block Segmentation, and code block-level CRC attachment.

In one embodiment, the X bit blocks obtain the X first-type radio signals respectively through the first preprocessing in the present disclosure.

In one embodiment, the X bit blocks obtain the X first-type radio signals respectively through the second preprocessing in the present disclosure.

In one embodiment, one of the X first-type radio signals is obtained by all or part of bits of any of the X bit blocks through the first preprocessing in the present disclosure.

In one embodiment, one of the X first-type radio signals is obtained by all or part of bits of any of the X bit blocks through the second preprocessing in the present disclosure.

In one embodiment, any of the X first-type radio signals is an output of all or part of bits of any of the X bit blocks through the first preprocessing in the present disclosure.

In one embodiment, any of the X first-type radio signals is an output of all or part of bits of any of the X bit blocks through the second preprocessing in the present disclosure.

In one embodiment, only one of the X bit blocks is used to generate one of the X first-type radio signals.

In one embodiment, there exists a bit block other than the X bit blocks being used to generate one of the X first-type radio signals.

In one embodiment, the X first-type radio signals respectively correspond to X HARQ processes, and the X bit blocks are respectively processed by the X HARQ processes.

In one embodiment, at least one of the X HARQ processes is synchronous.

In one embodiment, at least one of the X HARQ processes is asynchronous.

In one embodiment, at least one of the X HARQ processes is self-adaptive.

In one embodiment, at least one of the X HARQ processes is non-adaptive.

In one embodiment, there exist at least two of the X first-type radio signals not belonging to a same HARQ process.

In one embodiment, the X first-type radio signals are generated by X HARQ processes respectively.

In one embodiment, the X bit blocks obtain the X first-type radio signals respectively through the X HARQ processes.

In one embodiment, there exist at least two of the X first-type radio signals corresponding to different HARQ process identities.

In one embodiment, the X first-type radio signals respectively correspond to X HARQ process identities.

In one embodiment, the X first-type radio signals are respectively first transmissions of the X bit blocks.

In one embodiment, the X first-type radio signals are respectively retransmissions of the X bit blocks.

In one embodiment, RVs corresponding to the X bit blocks are different.

In one embodiment, RVs corresponding to the X bit blocks are the same.

In one embodiment, there exist RVs corresponding to two of the X first-type radio signals being different.

In one embodiment, a second radio signal and a third radio signal are comprised in the X first-type radio signals, the second radio signal is a first transmission of one of the X bit blocks, and the third radio signal is a retransmission of another one of the X bit blocks.

In one embodiment, a first HARQ process is one of the X HARQ processes, a second bit block is one of the X bit blocks, and the second bit block is processed by the first HARQ process.

In one embodiment, all or part of the bits in the second bit block are used to generate an eighth radio signal, and the eighth radio signal is one of the X first-type radio signals.

In one embodiment, an eighth radio signal is obtained by all or part of bits in the second bit block through the first preprocessing in the present disclosure, and the eighth radio signal is one of the X first-type radio signals.

In one embodiment, an eighth radio signal is obtained by all or part of bits in the second bit block through the second preprocessing in the present disclosure, and the eighth radio signal is one of the X first-type radio signals.

In one embodiment, an eighth radio signal is obtained by the second bit block being processed by the first HARQ process, and the eighth radio signal is one of the X first-type radio signals.

In one embodiment, a time-domain position of time-domain resources occupied by the eighth radio signal is used to determine the first HARQ process identity.

In one embodiment, a time-domain position of time-domain resources occupied by the eighth radio signal indicated by the second signaling is used to determine the first HARQ process identity.

In one embodiment, a slot corresponding to time-domain resources occupied by the eighth radio signal is used to determine the first HARQ process identity.

In one embodiment, a subframe corresponding to time-domain resources occupied by the eighth radio signal is used to determine the first HARQ process identity.

In one embodiment, a time-domain position of time-domain resources occupied by the eighth radio signal is used to select the first HARQ process identity out of at least one of HARQ process identity.

Embodiment 10

Figure 10:
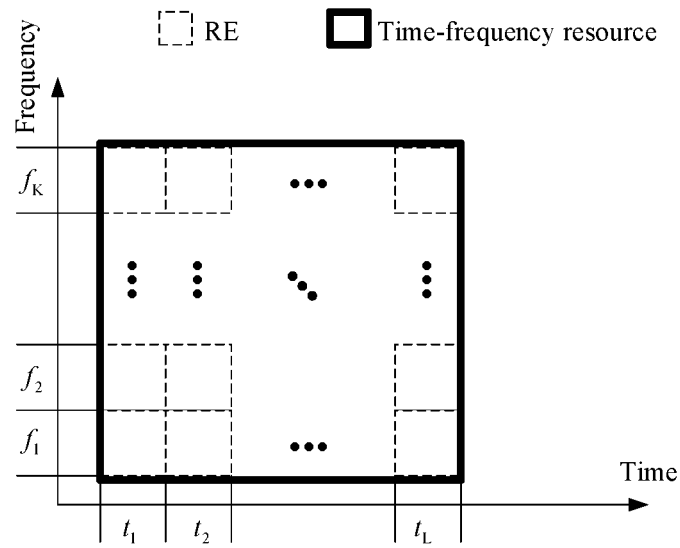
FIG. 10 illustrates a schematic diagram of a time-frequency resource according to one embodiment of the present disclosure.

Embodiment 10 illustrates a schematic diagram of a time-frequency resource according to one embodiment of the present disclosure, as shown in FIG. 10. In FIG. 10, a dotted-line-framed small box represents a Resource Element (RE), and a solid-line-framed box represents a time-frequency resource. In FIG. 10, a time-frequency resource occupies K subcarrier(s) in frequency domain, and L multicarrier symbol(s) in time domain, the K and the L being positive integers. In FIG. 10, $t_1, t_2, \ldots, t_L$ represents (represent) the L symbol(s), and $f_1, f_2, \ldots, f_K$ represents (represent) the K subcarrier(s).

In Embodiment 10, a time-frequency resource occupies K subcarrier(s) in frequency domain, and L multicarrier symbol(s) in time domain, the K and the L being positive integers.

In one embodiment, the K is equal to 12.

In one embodiment, the K is equal to 72.

In one embodiment, the K is equal to 127.

In one embodiment, the K is equal to 240.

In one embodiment, the L is equal to 1.

In one embodiment, the L is equal to 2.

In one embodiment, the L is not greater than 14.

In one embodiment, any of the L multicarrier symbol(s) is at least one of a Frequency Division Multiple Access (FDMA) symbol, an Orthogonal Frequency Division Multiplexing (OFDM) symbol, a Single-Carrier Frequency Division Multiple Access (SC-FDMA), a Discrete Fourier Transform Spread Orthogonal Frequency Division Multiplexing (DFTS-OFDM) symbol, a Filter Bank Multi-Carrier (FBMC) symbol, or an Interleaved Frequency Division Multiple Access (IFDMA) symbol.

In one embodiment, the time-domain resource comprises at least one radio frame.

In one embodiment, the time-domain resource is a radio frame.

In one embodiment, the time-domain resource comprises at least one subframe.

In one embodiment, the time-domain resource is a subframe.

In one embodiment, the time-domain resource comprises at least one slot.

In one embodiment, the time-domain resource is a slot.

In one embodiment, the time-domain resource comprises at least one multi-carrier symbol.

In one embodiment, the time-domain resource is a multi-carrier symbol.

In one embodiment, the frequency-domain resource comprises at least one carrier.

In one embodiment, the frequency-domain resource is a carrier.

In one embodiment, the frequency-domain resource comprises at least one Bandwidth Part (BWP).

In one embodiment, the frequency-domain resource is a BWP.

In one embodiment, the frequency-domain resource comprises at least one subchannel.

In one embodiment, the frequency-domain resource is a subchannel.

In one embodiment, the subchannel comprises at least one Resource Block (RB).

In one embodiment, a number of RBs comprised in the subchannel is variable.

In one embodiment, the RB comprises at least one subcarrier in frequency domain.

In one embodiment, the RB comprises 12 subcarriers in frequency domain.

In one embodiment, the subchannel comprises at least one Physical Resource Block (PRB).

In one embodiment, a number of PRBs comprised in the subchannel is variable.

In one embodiment, the PRB comprises at least one subcarrier in frequency domain.

In one embodiment, the PRB comprises 12 subcarriers in frequency domain.

In one embodiment, the frequency-domain resource comprises at least one RB.

In one embodiment, the frequency-domain resource is an RB.

In one embodiment, the frequency-domain resource comprises at least one PRB.

In one embodiment, the frequency-domain resource is an PRB.

In one embodiment, the frequency-domain resource comprises at least one subcarrier.

In one embodiment, the frequency-domain resource is a subcarrier.

In one embodiment, the time-frequency resource comprises R RE(s), R being a positive integer.

In one embodiment, the time-frequency resource consists of R RE(s), R being a positive integer.

In one embodiment, any of the R RE(s) occupies a multicarrier symbol in time domain and a subcarrier in frequency domain.

In one embodiment, an SCS of the RE is measured by Hertz (Hz).

In one embodiment, an SCS of the RE is measured by Kilohertz (kHz).

In one embodiment, an SCS of the RE is measured by Megahertz (MHz).

In one embodiment, a symbol length of a multicarrier symbol of the RE is measured by sampling point.

In one embodiment, a symbol length of a multicarrier symbol of the RE is measured by μs.

In one embodiment, a symbol length of a multicarrier symbol of the RE is measured by ms.

In one embodiment, an SCS of the RE is at least one of 1.25 kHz, 2.5 kHz, 5 kHz, 15 kHz, 30 kHz, 60 kHz, 120 kHz or 240 kHz.

In one embodiment, the time-frequency resource comprises the K subcarrier(s) and the L multicarrier symbol(s), and a product of the K and the L being not less than the R.

In one embodiment, the time-frequency resource does not comprise an RE allocated to a Guard Period (GP).

In one embodiment, the time-frequency resource does not comprise a RE allocated to a Reference Signal (RS).

In one embodiment, the time-frequency resource does not comprise an RE allocated to the first-type signal in the present disclosure.

In one embodiment, the time-frequency resource does not comprise an RE allocated to the first-type channel in the present disclosure.

In one embodiment, the time-frequency resource does not comprise an RE allocated to the second-type signal in the present disclosure.

In one embodiment, the time-frequency resource does not comprise an RE allocated to the second-type channel in the present disclosure.

In one embodiment, the time-frequency resources comprise at least one RB.

In one embodiment, the time-frequency resource belongs to an RB.

In one embodiment, the time-frequency resource is equal to an RB in frequency domain.

In one embodiment, the time-frequency resource comprises 6 RBs in frequency domain.

In one embodiment, the time-frequency resource comprises 20 RBs in frequency domain.

In one embodiment, the time-frequency resource comprises at least one PRB.

In one embodiment, the time-frequency resource belongs to a PRB.

In one embodiment, the time-frequency resource is equal to a PRB in frequency domain.

In one embodiment, the time-frequency resource comprises at least one Virtual Resource Block (VRB).

In one embodiment, the time-frequency resource belongs to an VRB.

In one embodiment, the time-frequency resource is equal to an VRB in frequency domain.

In one embodiment, the time-frequency resource comprises at least one Physical Resource Block (PRB) pair.

In one embodiment, the time-frequency resource belongs to a PRB pair.

In one embodiment, the time-frequency resource is equal to a PRB pair in frequency domain.

In one embodiment, the time-frequency resource comprises at least one radio frame.

In one embodiment, the time-frequency resource belongs to a radio frame.

In one embodiment, the time-frequency resource is equal to a radio frame in time domain.

In one embodiment, the time-frequency resource comprises at least one subframe.

In one embodiment, the time-frequency resource belongs to a subframe.

In one embodiment, the time-frequency resource is equal to a subframe in time domain.

In one embodiment, the time-frequency resources comprise at least one slot.

In one embodiment, the time-frequency resource belongs to a slot.

In one embodiment, the time-frequency resource is equal to a slot in time domain.

In one embodiment, the time-frequency resources comprise at least one symbol.

In one embodiment, the time-frequency resource belongs to a Symbol.

In one embodiment, the time-frequency resource is equal to a symbol in time domain.

In one embodiment, the time-frequency resource belongs to the third-type signal in the present disclosure.

In one embodiment, the time-frequency resource belongs to the third-type channel in the present disclosure.

In one embodiment, a duration of the time-domain resource in the present disclosure is equal to a time-domain duration of the time-frequency resource in the present disclosure.

Embodiment 11

Figure 11:
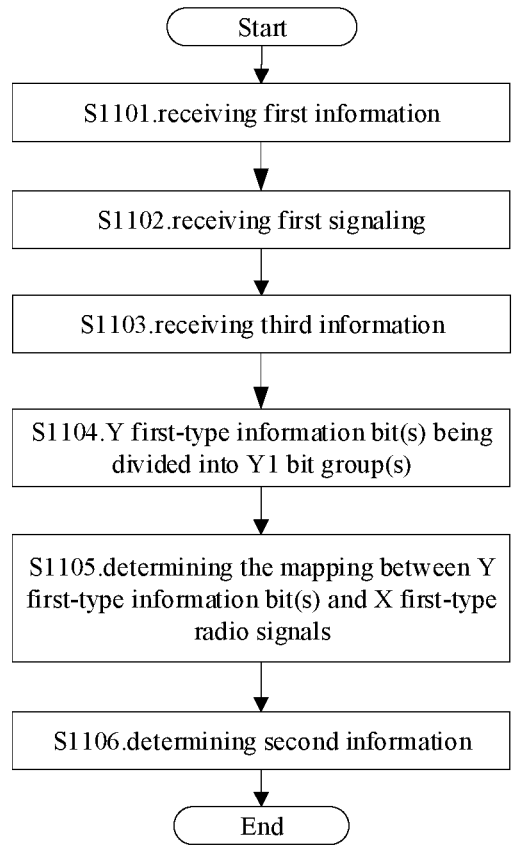
FIG. 11 illustrates a schematic diagram of determining second information according to one embodiment of the present disclosure.

Embodiment 11 illustrates a flowchart of determining second information according to one embodiment of the present disclosure, as shown in FIG. 11.

In Embodiment 11, first information is received in step S1101; a first signaling is received in step S1102; third information is received in step S1103; in step S1104, the Y first-type information bit(s) is(are) divided into Y1 bit-group(s); in step S1105, the mapping between Y first type information bit(s) and X first-type radio signals is determined; and in step S1106, second information is determined.

In Embodiment 11, the first information in the present disclosure and the first signaling are used together to determine the second information; the third information is used to generate the second information; the second information comprises the Y first-type information bit(s); the Y first-type information bit(s) is(are) used to indicate whether at least one of the X first-type radio signals is correctly received, or, the Y first-type information bit(s) is(are) used to indicate whether at least one of the X first-type radio signals is not correctly received; the Y first-type information bit(s) comprises(comprise) the Y1 bit-group(s); the Y1 bit-group(s) is(are) used to indicate whether at least one of the X first-type radio signals is correctly received, or, the Y1 bit-group(s) is(are) used to indicate that at least one of the X first-type radio signals is not correctly received.

In one embodiment, the first signaling is used to indirectly determine the second information.

In one embodiment, the first signaling is used to implicitly indicate the second information.

In one embodiment, the Y first-type information bit(s) and the Y0 information bit(s) are comprised in the second information, and any of the Y0 information bit(s) does not belong to the Y first-type information bit(s); the first signaling is used to indicate a first time-frequency-resource set, and the third information is transmitted in the first time-frequency-resource set.

In one embodiment, the first time-frequency-resource set comprises at least one of the time-frequency resource.

In one embodiment, the first time-frequency-resource set belongs to the PSFCH.

In one embodiment, the first time-frequency-resource set belongs to the PSCCH.

In one embodiment, the first time-frequency-resource set belongs to the PSSCH.

In one embodiment, at least one of a time-domain position of time-domain resources in the first time-frequency-resource set or a frequency-domain position of frequency-domain resources in the first time-domain resource set is used to determine a distribution pattern of the Y first-type information bit(s) in the at least one information bit comprised in the second information.

In one embodiment, the Y first-type information bit(s) and the Y0 information bit(s) are comprised in the second information, the first signaling is used to indicate a first time-frequency-resource set, a time-domain position of time-domain resources in the first time-frequency-resource set is used to determine a distribution pattern of the Y first-type information bit(s) in the at least one information bit comprised in the second information.

In one embodiment, the Y first-type information bit(s) and the Y0 information bit(s) are comprised in the second information, the first signaling is used to indicate a first time-frequency-resource set, a frequency-domain position of frequency-domain resources in the first time-frequency-resource set is used to determine a distribution pattern of the Y first-type information bit(s) in the at least one information bit comprised in the second information.

In one embodiment, the Y first-type information bit(s) and the Y0 information bit(s) are comprised in the second information, the first signaling is used to indicate a first time-frequency-resource set, a time-domain position of time-domain resources in the first time-frequency-resource set and a frequency-domain position of frequency-domain resources in the first time-frequency-resource set are used together to determine a distribution pattern of the Y first-type information bit(s) in the at least one information bit comprised in the second information.

In one embodiment, the distribution pattern comprises frequency-division multiplexing of the Y first-type information bit(s) and the Y0 information bit(s).

In one embodiment, the distribution pattern comprises time-division multiplexing of the Y first-type information bit(s) and the Y0 information bit(s).

In one embodiment, the distribution pattern comprises that the Y first-type information bit(s) and the Y0 information bit(s) are cross-distributed in the second information.

In one embodiment, the distribution pattern comprises that a position of any of the Y first-type information bit(s) in the second information is before the Y0 information bit(s).

In one embodiment, the distribution pattern comprises that the Y first-type information bit(s) and the Y0 information bit(s) generate the second information after joint coding.

In one embodiment, the distribution pattern comprises the second information generated after that the Y first-type information bit(s) and the Y0 information bit(s) are distributed independently and encoded and then cascaded.

In one embodiment, time-domain resources of the first time-frequency-resource set are located in a last multicarrier symbol in a slot, and the Y first-type information bit(s) and the Y0 information bit(s) are cross-distributed in the second information.

In one embodiment, time-domain resources of the first time-frequency-resource set are located in last multiple multicarrier symbols in a slot, and the Y first-type information bit(s) and the Y0 information bit(s) are jointly coded.

In one embodiment, the first time-frequency-resource set is on the PSFCH, and the Y first-type information bit(s) and the Y0 information bit(s) are respectively and independently coded and then cascaded to generate the second information.

In one embodiment, the first time-frequency-resource set is on the PSFCH, and the Y first-type information bit(s) and the Y0 information bit(s) generate the second information after through joint coding.

Embodiment 12

Figure 12:
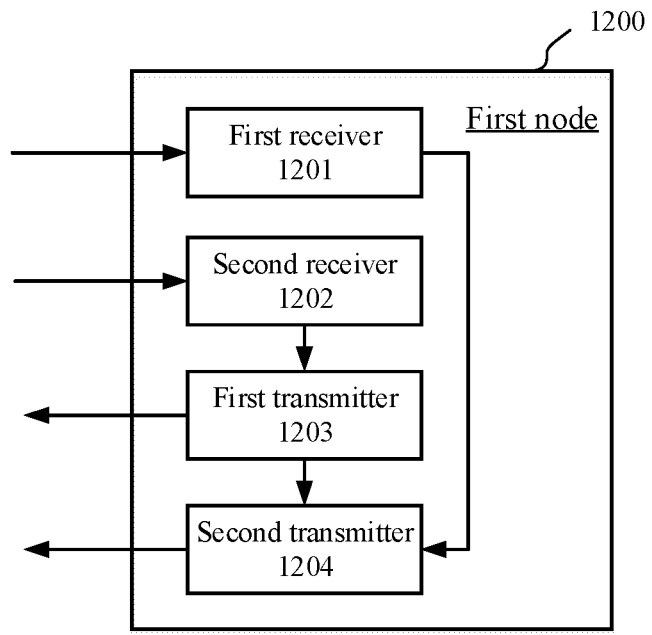
FIG. 12 illustrates a structure block diagram of a processing device in a first node according to one embodiment of the present disclosure.

Embodiment 12 illustrates a structure block diagram of a processing device used in a first node, as shown in FIG. 12. In Embodiment 12, a first node's processing device 1200 mainly consists of a first receiver 1201, a second receiver 1202, a first transmitter 1203 and a second transmitter 1204.

In one embodiment, the first receiver 1201 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first receiver 1201 comprises the antenna 452, the transmitter/receiver 454, the multi-antenna receiving processor 458, the receiving processor 456, the controller/processor 459, the memory 460 and the data source 467 in FIG. 4 of the present disclosure.

In one embodiment, the second receiver 1202 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the second receiver 1202 comprises the antenna 452, the transmitter/receiver 454, the multi-antenna receiving processor 458 and the receiving processor 456 in FIG. 4 of the present disclosure.

In one embodiment, the first transmitter 1203 comprises at least one of the antenna 452, the transmitter/receiver 454, the multi-antenna transmitting processor 457, the transmitting processor 468, the controller/processor 459, the memory 460, or the data source 467 in FIG. 4 of the present disclosure.

In one embodiment, the first transmitter 1203 comprises the antenna 452, the transmitter/receiver 454, the multi-antenna transmitting processor 457 and the transmitting processor 468 in FIG. 4 of the present disclosure.

In one embodiment, the second transmitter 1204 comprises at least one of the antenna 452, the transmitter/receiver 454, the multi-antenna transmitting processor 457, the transmitting processor 468, the controller/processor 459, the memory 460, or the data source 467 in FIG. 4 of the present disclosure.

In one embodiment, the second transmitter 1204 comprises the antenna 452, the transmitter/receiver 454, the multi-antenna transmitting processor 457 and the transmitting processor 468 in FIG. 4 of the present disclosure.

In Embodiment 12, the first receiver 1201 receives first information; the second receiver 1202 receives a first signaling; a first transmitter 1203 transmits X first-type radio signals, X being a positive integer greater than 1; and a second transmitter 1204 transmits second information, and the second information comprises Y first-type information bit(s), Y being a positive integer; the first information is used to determine the second information, and the first signaling is used to determine scheduling information of at least one of the X first-type radio signals; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface.

In one embodiment, the first transmitter 1203 determines the second information, and the first information is used to determine the mapping between the Y first-type information bit(s) in the second information and the X first-type radio signals.

In one embodiment, the first transmitter 1203 determines the second information, and the first information is used to determine the Y.

In one embodiment, the first transmitter 1203 determines the second information, and the first information is used to determine the mapping between the Y first-type information bit(s) in the second information and the X first-type radio signals as well as the Y.

In one embodiment, the Y first-type information bit(s) is(are) divided into Y1 bit-group(s), and at least one of the Y1 bit-group(s) is used to indicate whether at least one of the X first-type radio signals is correctly received.

In one embodiment, the Y first-type information bit(s) is(are) divided into Y1 bit-group(s), and at least one of the Y1 bit-group(s) is used to indicate whether at least one of the X first-type radio signals is not correctly received.

In one embodiment, a first bit block is used to generate any of the X first-type radio signals, and the first bit block comprises at least one bit; RVs of the X first-type radio signals are the same.

In one embodiment, a first bit block is used to generate any of the X first-type radio signals, and the first bit block comprises at least one bit; a time-domain position of time-domain resources occupied by a first-type radio signal of the X first-type radio signals is used to determine an RV of the first-type radio signal.

In one embodiment, X bit blocks are respectively used to generate the X first-type radio signals, and any of the X bit blocks comprises at least one bit; the X first-type radio signals respectively correspond to X HARQ processes, the X bit blocks respectively belong to the X HARQ processes, a first HARQ process is one of the X HARQ processes, a time-domain position of time-domain resources occupied by a first-type radio signal of the X first-type radio signals corresponding to the first HARQ process is used to determine a signature identity of the first HARQ process.

In one embodiment, the second receiver 1202 receives third information, and a transmitter of the third information is the same as a target receiver of at least one of the X first-type radio signals; the third information is used to indicate whether at least one of the X first-type radio signals is correctly received; the third information is used to generate the second information.

In one embodiment, the second receiver 1202 receives third information, and a transmitter of the third information is the same as a target receiver of at least one of the X first-type radio signals; the third information is used to indicate whether at least one of the X first-type radio signals is not correctly received; the third information is used to generate the second information.

In one embodiment, the first transmitter 1203 transmits a second signaling, the second signaling is used to indicate the scheduling information of at least one of the X first-type radio signals, and the first signaling is used to determine information carried by the second signaling; a target receiver of the second signaling is the same as a target receiver of at least one of the X first-type radio signals, the second signaling is transmitted via a second-type air interface, and the second-type air interface is different from the first-type air interface.

In one embodiment, if an information bit other than the Y first-type information bit(s) is comprised in the second information, the first signaling is used to indicate a first time-frequency-resource set, a time-domain position of time-domain resources in the first time-frequency-resource set is used to determine a distribution pattern of the Y first-type information bit(s) in the at least one information bit comprised in the second information.

In one embodiment, if an information bit other than the Y first-type information bit(s) is comprised in the second information, the first signaling is used to indicate a first time-frequency-resource set, a frequency-domain position of frequency-domain resources in the first time-frequency-resource set is used to determine a distribution pattern of the Y first-type information bit(s) in the at least one information bit comprised in the second information.

In one embodiment, if an information bit other than the Y first-type information bit(s) is comprised in the second information, the first signaling is used to indicate a first time-frequency-resource set, a time-domain position of time-domain resources in the first time-frequency-resource set and a frequency-domain position of frequency-domain resources in the first time-frequency-resource set are used to determine a distribution pattern of the Y first-type information bit(s) in the at least one information bit comprised in the second information.

In one embodiment, the first node 1200 is a UE.

In one embodiment, the first node 1200 is a relay node.

In one embodiment, the first node 1200 is a vehicle-mounted communication device.

In one embodiment, the first node 1200 is a UE supporting V2X communications.

In one embodiment, the first node 1200 is a relay node supporting V2X communications.

Embodiment 13

Embodiment 13 illustrates a structure block diagram of a processing device used in a second node, as shown in FIG.

Figure 13:
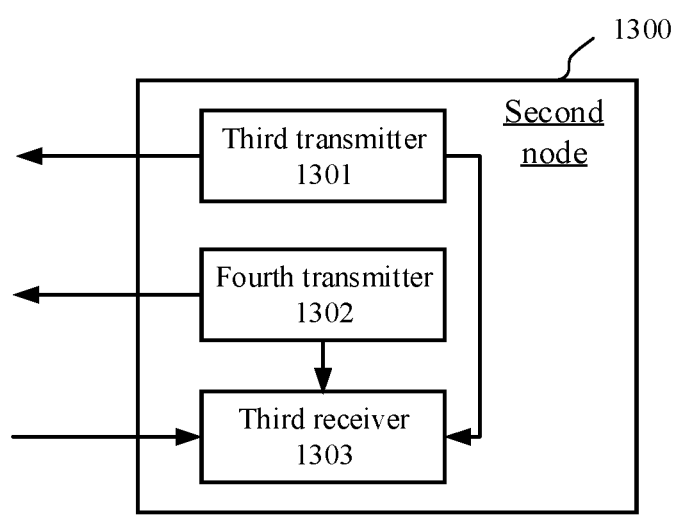
FIG. 13 illustrates a structure block diagram of a processing device in a second node according to one embodiment of the present disclosure.

13. In FIG. 13, the second node processing device 1300 mainly consists of a third transmitter 1301, a fourth transmitter 1302 and a third receiver 1303.

In one embodiment, the third transmitter 1301 comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the third transmitter 1301 comprises the antenna 420, the transmitter/receiver 418, the multi-antenna transmitting processor 471, the transmitting processor 416, the controller/processor 475 and the memory 476 in FIG. 4 of the present disclosure.

In one embodiment, the fourth transmitter 1302 comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the fourth transmitter 1302 comprises the antenna 420, the transmitter/receiver 418, the multi-antenna transmitting processor 471 and the transmitting processor 416 in FIG. 4 of the present disclosure.

In one embodiment, the third receiver 1303 comprises at least one of the antenna 420, the transmitter/receiver 418, the multi-antenna receiving processor 472, the receiving processor 470, the controller/processor 475 or the memory 476 in FIG. 4 of the present disclosure.

In one embodiment, the third receiver 1303 comprises the antenna 420, the transmitter/receiver 418, the multi-antenna receiving processor 472 and the receiving processor 470 in FIG. 4 of the present disclosure.

In Embodiment 13, the third transmitter 1301 transmits first information; the fourth transmitter 1302 transmits a first signaling; a third receiver 1303 receives second information, and the second information comprises Y first-type information bit(s), Y being a positive integer; the first information is used to determine the second information, and the first signaling is used to determine scheduling information of at least one of X first-type radio signals, and the X first-type radio signals are transmitted by a target receiver of the first signaling; the second information comprising at least one information bit, and only the Y first-type information bit(s) of the at least one information bit comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface.

In one embodiment, the Y first-type information bit(s) is(are) divided into Y1 bit-group(s), and at least one of the Y1 bit-group(s) is used to indicate whether at least one of the X first-type radio signals is correctly received.

In one embodiment, the Y first-type information bit(s) is(are) divided into Y1 bit-group(s), and at least one of the Y1 bit-group(s) is used to indicate whether at least one of the X first-type radio signals is not correctly received.

In one embodiment, if an information bit other than the Y first-type information bit(s) is comprised in the second information, the first signaling is used to indicate a first time-frequency-resource set, a time-domain position of time-domain resources in the first time-frequency-resource set is used to determine a distribution pattern of the Y first-type information bit(s) in the at least one information bit comprised in the second information.

In one embodiment, if an information bit other than the Y first-type information bit(s) is comprised in the second information, the first signaling is used to indicate a first time-frequency-resource set, a frequency-domain position of frequency-domain resources in the first time-frequency-resource set is used to determine a distribution pattern of the Y first-type information bit(s) in the at least one information bit comprised in the second information.

In one embodiment, if an information bit other than the Y first-type information bit(s) is comprised in the second information, the first signaling is used to indicate a first time-frequency-resource set, a time-domain position of time-domain resources in the first time-frequency-resource set and a frequency-domain position of frequency-domain resources in the first time-frequency-resource set are used to determine a distribution pattern of the Y first-type information bit(s) in the at least one information bit comprised in the second information.

In one embodiment, the second node 1300 is a base station.

In one embodiment, the second node 1300 is a relay node.

In one embodiment, the second node 1300 is a base station supporting V2X communications.

In one embodiment, the second node 1300 is a relay node supporting V2X communications.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:
    receiving first information;
    receiving a first signaling;
    transmitting X first-type radio signals, X being a positive integer greater than 1; and
    transmitting second information, the second information comprising Y first-type information bit(s), Y being a positive integer;
    wherein the first information is used to determine the second information, and the first signaling is used to determine scheduling information of at least one of the X first-type radio signals; the second information comprising multiple information bits, and only the Y first-type information bit(s) of the multiple information bits comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted Modulation and Coding Scheme (MCS) or an adopted Redundancy Version (RV); the first information, the first signaling and the second information are all transmitted via a first-type air interface; when an information bit other than the Y first-type information bit(s) is comprised in the second information, the first signaling is used to indicate a first time-frequency-resource set, a time-domain position of time-domain resources in the first time-frequency-resource set is used to determine a distribution pattern of the Y first-type information bit(s) in the multiple information bits comprised in the second information.

2. The method according to claim 1, comprising:
    determining the second information;
    wherein the first information is used to determine the mapping between the Y first-type information bit(s) in the second information and the X first-type radio signals, or the first information is used to determine the Y, or the first information is used to determine the mapping between the Y first-type information bit(s) in the second information and the X first-type radio signals as well as the Y.

3. The method according to claim 1, wherein the Y first-type information bit(s) is(are) divided into Y1 bit-group(s), at least one of the Y1 bit-group(s) is used to indicate whether at least one of the X first-type radio signals is correctly received, or at least one of the Y1 bit-group(s) is used to indicate whether at least one of the X first-type radio signals is not correctly received.

4. The method according to claim 1, wherein a first bit block is used to generate any of the X first-type radio signals, and the first bit block comprises at least one bit; RVs of the X first-type radio signals are the same, or a time-domain position of time-domain resources occupied by a first-type radio signal of the X first-type radio signals is used to determine an RV of the first-type radio signal.

5. The method according to claim 1, wherein X bit blocks are respectively used to generate the X first-type radio signals, and any of the X bit blocks comprises at least one bit; the X first-type radio signals respectively correspond to X HARQ processes, the X bit blocks respectively belong to the X HARQ processes, a first HARQ process is one of the X HARQ processes, a time-domain position of time-domain resources occupied by a first-type radio signal of the X first-type radio signals corresponding to the first HARQ process is used to determine a signature identity of the first HARQ process.

6. The method according to claim 1, comprising:
    receiving third information;
    wherein a transmitter of the third information is the same as a target receiver of at least one of the X first-type radio signals; the third information is used to indicate whether at least one of the X first-type radio signals is correctly received, or the third information is used to indicate whether at least one of the X first-type radio signals is not correctly received; the third information is used to generate the second information.

7. The method according to claim 1, also comprising:
    transmitting a second signaling;
    wherein the second signaling is used to indicate the scheduling information of at least one of the X first-type radio signals, and the first signaling is used to determine information carried by the second signaling; a target receiver of the second signaling is the same as a target receiver of at least one of the X first-type radio signals, the second signaling is transmitted via a second-type air interface, and the second-type air interface is different from the first-type air interface.

8. A method in a second node for wireless communications, comprising:
    transmitting first information;
    transmitting a first signaling; and
    receiving second information, the second information comprising Y first-type information bit(s), Y being a positive integer;
    wherein the first information is used to determine the second information, and the first signaling is used to determine scheduling information of at least one of X first-type radio signals, and the X first-type radio signals are transmitted by a target receiver of the first signaling; the second information comprising multiple information bits, and only the Y first-type information bit(s) of the multiple information bits comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface; when an information bit other than the Y first-type information bit(s) is comprised in the second information, the first signaling is used to indicate a first time-frequency-resource set, a time-domain position of time-domain resources in the first time-frequency-resource set is used to determine a distribution pattern of the Y first-type information bit(s) in the multiple information bits comprised in the second information.

9. The method according to claim 8, wherein the Y first-type information bit(s) is(are) divided into Y1 bit-group(s), at least one of the Y1 bit-group(s) is used to indicate whether at least one of the X first-type radio signals is correctly received, or at least one of the Y1 bit-group(s) is used to indicate whether at least one of the X first-type radio signals is not correctly received.

10. A first node for wireless communications, comprising:
a first receiver, which receives first information;
a second receiver, which receives a first signaling;
a first transmitter, which transmits X first-type radio signals, X being a positive integer greater than 1; and
a second transmitter, which transmits second information, the second information comprising Y first-type information bit(s), Y being a positive integer;
wherein the first information is used to determine the second information, and the first signaling is used to determine scheduling information of at least one of the X first-type radio signals; the second information comprising multiple information bits, and only the Y first-type information bit(s) of the multiple information bits comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface; when an information bit other than the Y first-type information bit(s) is comprised in the second information, the first signaling is used to indicate a first time-frequency-resource set, a time-domain position of time-domain resources in the first time-frequency-resource set is used to determine a distribution pattern of the Y first-type information bit(s) in the multiple information bits comprised in the second information.

11. The first node according to claim 10, comprising:
the first transmitter, which determines the second information;
wherein the first information is used to determine the mapping between the Y first-type information bit(s) in the second information and the X first-type radio signals, or the first information is used to determine the Y, or the first information is used to determine the mapping between the Y first-type information bit(s) in the second information and the X first-type radio signals as well as the Y.

12. The first node according to claim 10, wherein the Y first-type information bit(s) is(are) divided into Y1 bit-group(s), at least one of the Y1 bit-group(s) is used to indicate whether at least one of the X first-type radio signals is correctly received, or at least one of the Y1 bit-group(s) is used to indicate whether at least one of the X first-type radio signals is not correctly received.

13. The first node according to claim 10, wherein a first bit block is used to generate any of the X first-type radio signals, and the first bit block comprises at least one bit; RVs of the X first-type radio signals are the same, or a time-domain position of time-domain resources occupied by a first-type radio signal of the X first-type radio signals is used to determine an RV of the first-type radio signal.

14. The first node according to claim 10, wherein X bit blocks are respectively used to generate the X first-type radio signals, and any of the X bit blocks comprises at least one bit; the X first-type radio signals respectively correspond to X HARQ processes, the X bit blocks respectively belong to the X HARQ processes, a first HARQ process is one of the X HARQ processes, a time-domain position of time-domain resources occupied by a first-type radio signal of the X first-type radio signals corresponding to the first HARQ process is used to determine a signature identity of the first HARQ process.

15. The first node according to claim 10, comprising:
the second receiver, which receives third information;
wherein a transmitter of the third information is the same as a target receiver of at least one of the X first-type radio signals; the third information is used to indicate whether at least one of the X first-type radio signals is correctly received, or the third information is used to indicate whether at least one of the X first-type radio signals is not correctly received; the third information is used to generate the second information.

16. The first node according to claim 10, comprising:
the first transmitter, which transmits a second signaling;
wherein the second signaling is used to indicate the scheduling information of at least one of the X first-type radio signals, and the first signaling is used to determine information carried by the second signaling; a target receiver of the second signaling is the same as a target receiver of at least one of the X first-type radio signals, the second signaling is transmitted via a second-type air interface, and the second-type air interface is different from the first-type air interface.

17. A second node for wireless communications, comprising:
a third transmitter, which transmits first information;
a fourth transmitter, which transmits a first signaling; and
a third receiver, which receives second information, the second information comprising Y first-type information bit(s), Y being a positive integer;
wherein the first information is used to determine the second information, and the first signaling is used to determine scheduling information of at least one of X first-type radio signals, and the X first-type radio signals are transmitted by a target receiver of the first signaling; the second information comprising multiple information bits, and only the Y first-type information bit(s) of the multiple information bits comprised in the second information is(are) used to indicate whether at least one of the X first-type radio signals is correctly received; a target receiver of any of the X first-type radio signals is different from a target receiver of the second information; the scheduling information comprises at least one of occupied time-frequency resources, an adopted MCS or an adopted RV; the first information, the first signaling and the second information are all transmitted via a first-type air interface; when an information bit other than the Y first-type information bit(s) is comprised in the second information, the first signaling is used to indicate a first time-frequency-resource set, a time-domain position of time-domain resources in the first time-frequency-resource set is used to determine a distribution pattern of the Y first-type information bit(s) in the multiple information bits comprised in the second information.

18. The second node according to claim 17, wherein the Y first-type information bit(s) is(are) divided into Y1 bit-group(s), at least one of the Y1 bit-group(s) is used to indicate whether at least one of the X first-type radio signals is correctly received, or at least one of the Y1 bit-group(s) is used to indicate whether at least one of the X first-type radio signals is not correctly received.

* * * * *